US011192067B2

(12) United States Patent
Patrick

(10) Patent No.: US 11,192,067 B2
(45) Date of Patent: Dec. 7, 2021

(54) PROCESS AND APPARATUS TO REMOVE CARBON-14 FROM CARBON-DIOXIDE IN ATMOSPHERIC GASES AND AGRICULTURAL PRODUCTS GROWN IN CONTROLLED ENVIRONMENTS

(71) Applicant: Brett Evan Patrick, Grants Pass, OR (US)

(72) Inventor: Brett Evan Patrick, Grants Pass, OR (US)

( * ) Notice: Subject to any disclaimer, the term of this patent is extended or adjusted under 35 U.S.C. 154(b) by 0 days.

(21) Appl. No.: 17/159,517

(22) Filed: Jan. 27, 2021

(65) Prior Publication Data

US 2021/0146306 A1 May 20, 2021

Related U.S. Application Data

(62) Division of application No. 16/030,734, filed on Jul. 9, 2018, now Pat. No. 10,905,998.

(Continued)

(51) Int. Cl.
*B01D 53/24* (2006.01)
*B01D 59/20* (2006.01)
(Continued)

(52) U.S. Cl.
CPC ............. *B01D 59/20* (2013.01); *A01G 7/02* (2013.01); *B04C 5/04* (2013.01); *B04C 5/081* (2013.01);
(Continued)

(58) Field of Classification Search
CPC .... B01D 59/20; B01D 59/34; B01D 2258/05; B04C 5/081; B04C 5/181; B04C 5/04;
(Continued)

(56) References Cited

U.S. PATENT DOCUMENTS 1,344,146 A * 6/1920 Peck ..................... B04C 5/04
55/459.1
1,798,510 A * 3/1931 Winslow ............ F02M 35/022
55/426

(Continued)

OTHER PUBLICATIONS

Feiverson, H. A., Glaser, A., Mian, Z., & Von Hippel, F. N., Unmaking the Bomb: A Fissile Material Approach to Nuclear Disarmament and Nonproliferation, The MIT Press, Cambridge, Massachusetts, London, England (2014).

(Continued)

*Primary Examiner* — Dung H Bui
(74) *Attorney, Agent, or Firm* — Chernoff Vilhauer LLP

(57) ABSTRACT

This invention relates to a process and apparatus for growing agricultural products with a reduced abundance of radioactive carbon-14 ($^{14}C$) by employing centrifugal separation of atmospheric gases to selectively remove carbon dioxide ($CO_2$) with $^{14}C$. Agricultural products with reduced $^{14}C$ content can be grown in controlled environments with filtered atmospheric gases for the benefit of reducing harmful damage to human DNA that is unavoidable with our current food chain, due to the natural abundance of $^{14}C$ in atmospheric gases. Bilateral and unilateral compression helikon vortex apparatus provide efficient and economical removal of $CO_2$ with $^{14}C$ from atmospheric gases with a single filtration pass, which is ideally suited for large scale agricultural production.

5 Claims, 17 Drawing Sheets

Related U.S. Application Data

(60) Provisional application No. 62/535,211, filed on Jul. 20, 2017.

(51) Int. Cl.
| | | |
|---|---|---|
| *A01G 7/02* | (2006.01) | |
| *B04C 5/081* | (2006.01) | |
| *B04C 5/181* | (2006.01) | |
| *B04C 5/04* | (2006.01) | |
| *B04C 5/14* | (2006.01) | |
| B04C 9/00 | (2006.01) | |
| G21C 19/303 | (2006.01) | |

(52) U.S. Cl.
CPC ............ *B04C 5/14* (2013.01); *B04C 5/181* (2013.01); *B01D 2258/05* (2013.01); *B04C 2009/005* (2013.01); *G21C 19/303* (2013.01)

(58) Field of Classification Search
CPC ....... B04C 5/14; B04C 2009/005; A01G 7/02; G21C 19/303
See application file for complete search history.

(56) References Cited

U.S. PATENT DOCUMENTS

| | | | | |
|---|---|---|---|---|
| 1,985,947 | A | * | 1/1935 | O'Mara ................ B04C 5/14 55/426 |
| 2,033,471 | A | * | 3/1936 | Keenan ................ B04C 5/04 55/414 |
| 2,681,124 | A | * | 6/1954 | Van Der Kolk ........ B04C 5/14 55/398 |
| 2,781,910 | A | * | 2/1957 | Fontein ................ B04C 5/14 210/788 |
| 2,927,693 | A | | 3/1960 | Freeman et al. |
| 3,004,158 | A | | 10/1961 | Steimel |
| 3,129,173 | A | * | 4/1964 | Schulze ................ B04C 5/04 210/512.1 |
| 3,421,334 | A | | 1/1969 | McKinney et al. |
| 3,594,573 | A | | 7/1971 | Greber |
| 3,745,752 | A | | 7/1973 | Gallaer |
| 3,766,661 | A | | 10/1973 | Bayens et al. |
| 3,802,570 | A | | 4/1974 | Dehne |
| 3,850,816 | A | | 11/1974 | Koch |
| 3,925,036 | A | | 12/1975 | Shacter |
| 3,928,186 | A | | 12/1975 | Zemanek |
| 3,939,354 | A | | 2/1976 | Janes |
| 3,942,975 | A | | 3/1976 | Drummond et al. |
| 3,989,485 | A | | 11/1976 | Killian |
| 3,990,634 | A | | 11/1976 | Hejlek |
| 4,005,998 | A | | 2/1977 | Gorman |
| 4,070,171 | A | | 1/1978 | Wikdahl |
| 4,311,674 | A | | 1/1982 | Janner et al. |
| 4,317,716 | A | | 3/1982 | Liller |
| 4,578,199 | A | | 3/1986 | Peel et al. |
| 4,584,073 | A | | 4/1986 | Lahoda et al. |
| 4,638,674 | A | | 1/1987 | Redmann |
| 4,670,161 | A | | 6/1987 | Hayatdavoudi |
| 4,692,311 | A | | 9/1987 | Parker et al. |
| 4,816,209 | A | | 3/1989 | Schweiger |
| 4,842,145 | A | | 6/1989 | Boadway |
| 4,848,993 | A | | 7/1989 | Elkjaer |
| 4,865,633 | A | | 9/1989 | Stevenson |
| 5,071,557 | A | | 12/1991 | Schubert et al. |
| 5,106,514 | A | | 4/1992 | Alexander |
| 5,566,835 | A | | 10/1996 | Grimes |
| 5,771,844 | A | | 6/1998 | Dietz |
| 6,036,027 | A | | 3/2000 | Grimes |
| 6,530,484 | B1 | | 3/2003 | Bosman |
| 6,596,169 | B1 | | 7/2003 | Rong et al. |
| 7,332,715 | B2 | | 2/2008 | Russ, IV et al. |
| 8,192,614 | B2 | | 6/2012 | Niccum et al. |
| 8,460,434 | B2 | | 6/2013 | Turner et al. |
| 9,579,666 | B2 | | 2/2017 | Mangadoddy et al. |
| 2007/0131594 | A1 | | 6/2007 | Hakola |
| 2012/0285322 | A1 | | 11/2012 | Halpap et al. |
| 2013/0239816 | A1 | | 9/2013 | Mantilla et al. |

OTHER PUBLICATIONS

Genome Reference Consortium (GRC) Human Genome Assembly build 38 (GRCh38), Dec. 24, 2013, 4 pages.

Lander, E. S. et al., "Initial sequencing and analysis of the human genome", Nature 409, Feb. 15, 2001, pp. 860-921.

Moore, J. D. L., South Africa and Nuclear Proliferation, Palgrave Macmillan, New York, NY (1987).

Patrick, A. D., & Patrick, B. E., "Carbon 14 decay as a source of somatic point mutations in genes correlated with cancer diagnoses", Stable Isotope Foundation, Grants Pass, Oregon, USA, 2017, 81 pages.

Purdom, C. E., "Biological hazards of carbon-14", New Sci. 298, Aug. 2, 1962, pp. 255-257.

Sassi, M., et al., "Carbon-14 decay as a source of non-canonical bases in DNA", Biochimica et Biophysica Acta 1840, 2014, pp. 526-534.

Sender, R., Fuchs, S., & Milo, R., "Revised estimates for the number of human and bacteria cells in the body", PLoS Biol 14(8): e1002533, Aug. 19, 2016, 14 pages.

Office Action prepared by the US Patent and Trademark Office for U.S. Appl. No. 16/030,734, dated Apr. 24, 2020, 7 pages.

Office Action prepared by the US Patent and Trademark Office for U.S. Appl. No. 16/030,734, dated May 21, 2020, 12 pages.

\* cited by examiner

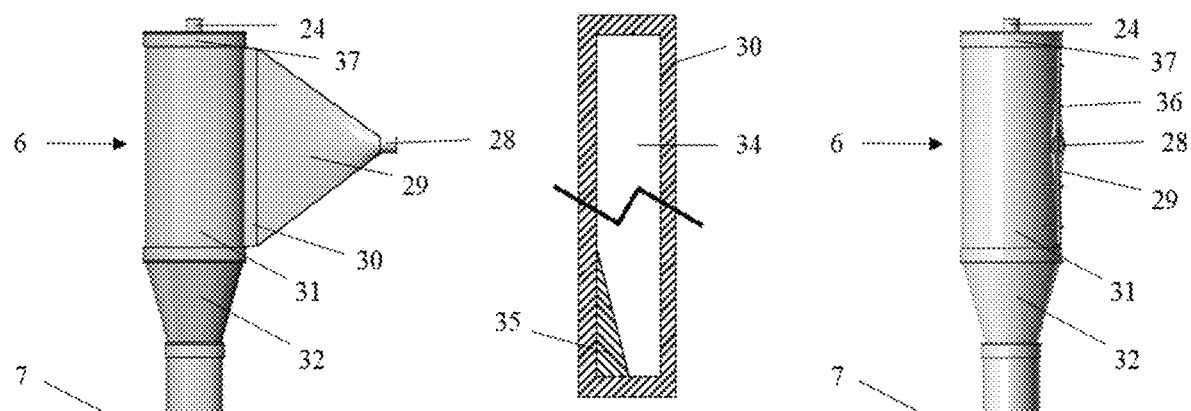
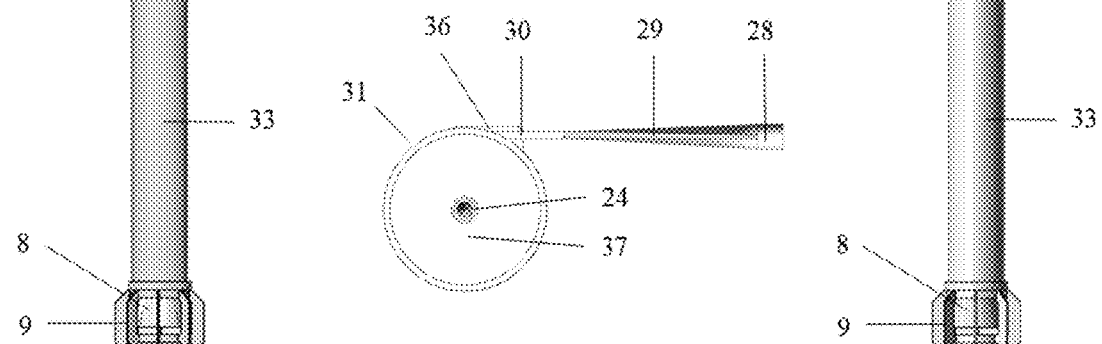
Fig. 3a  Fig. 3b  Fig. 3c
Fig. 3d

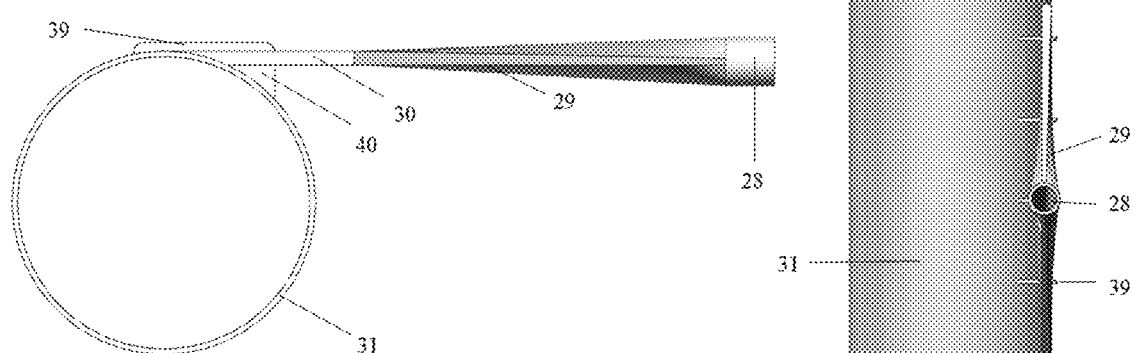
Fig. 5c
Fig. 5d
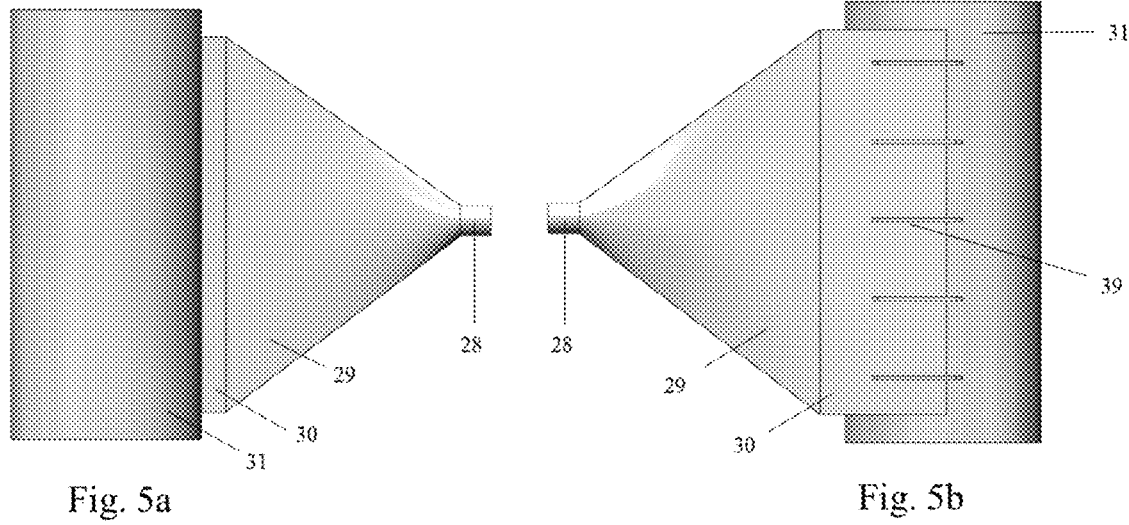
Fig. 5a
Fig. 5b

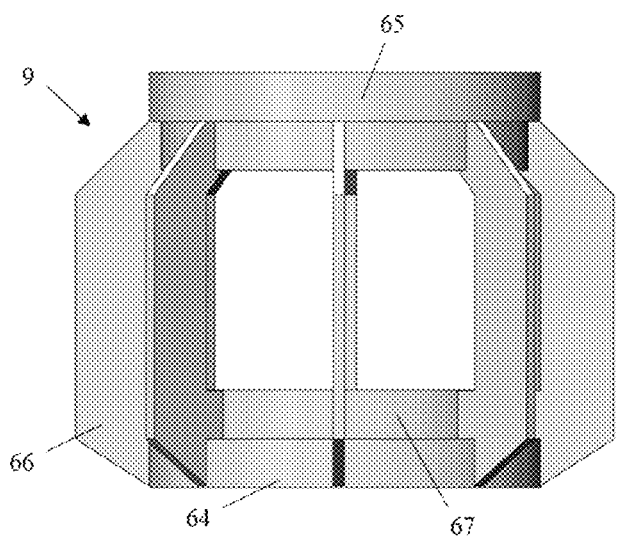
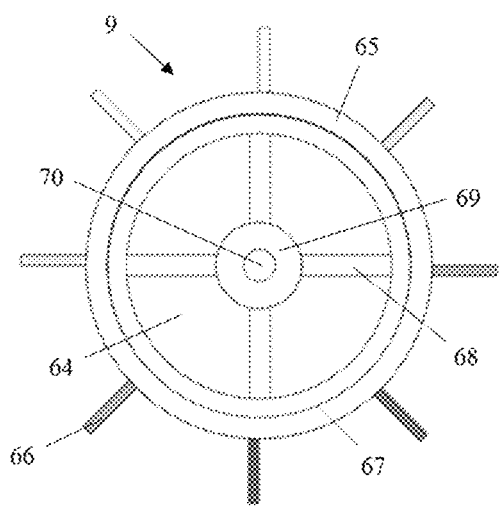
Fig. 14a    Fig. 14b
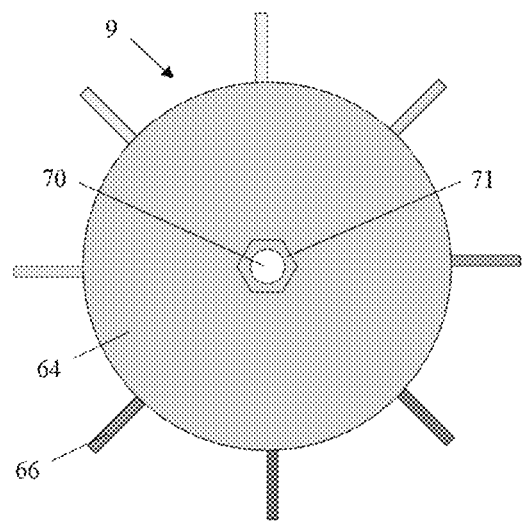
Fig. 14c

PROCESS AND APPARATUS TO REMOVE CARBON-14 FROM CARBON-DIOXIDE IN ATMOSPHERIC GASES AND AGRICULTURAL PRODUCTS GROWN IN CONTROLLED ENVIRONMENTS

CROSS REFERENCE TO RELATED APPLICATIONS

This application is a divisional of U.S. patent application Ser. No. 16/030,734 filed on Jul. 9, 2018, which claims the benefit of U.S. Provisional Application Ser. No. 62/535,211, filed on Jul. 20, 2017. The complete disclosures of the above applications are hereby incorporated by reference for all purposes.

BACKGROUND

This invention relates to a process and apparatus for growing agricultural products with a reduced abundance of carbon-14 ($^{14}C$) by employing centrifugal separation of atmospheric gases to remove carbon dioxide ($CO_2$) with radioactive $^{14}C$. Agricultural products with reduced $^{14}C$ content can be grown in controlled environments for the benefit of reducing harmful damage to human DNA that is unavoidable with our current food chain, due to the natural abundance of $^{14}C$ in atmospheric gases. Radioactive $^{14}C$ decay to nitrogen-14 with the release of 156 KeV has long been known to have biological effects (Purdom, C. E.). Sequencing of the human genome has identified 6.1 billion base pairs in human DNA, with 119 billion carbon atoms in the DNA of each nucleated cell (Lander, E. S., and Genome Reference Consortium (GRC) Human Genome Assembly build 38 (GRCh38)). Recent quantitative analysis of human tissues has estimated 3 trillion nucleated cells in the human body (Sender, R., Fuchs, S., & Milo, R.). Given the natural abundance and half-life of $^{14}C$ and composition of our genome (i.e., a mean of roughly $6.0 \times 10^9$ base pairs with 19.5 carbon atoms each), in the average human this decay is occurring once per second in human DNA, resulting in potential bond ruptures, DNA strand breakage, and nitrogen substitution in canonical bases (Sassi, M., et. al.). This cumulative damage has been positively correlated to cancer diagnoses (Patrick, A. D., & Patrick, B. E.), and may have other yet-to-be-quantified effects on human tissues as we age. In fact, no mammal has yet lived without this cumulative damage, so the qualitative benefits of precluding this genetic alteration are yet-to-be-quantified. To preclude this cumulative damage and genetic alteration, it is necessary to perform isotope separation on large volumes of atmospheric gases to remove $^{14}C$ from agricultural products and their derivatives in the food chain. This requires an economical means for the filtration of atmospheric gases and the growth of agricultural products in controlled environments.

BACKGROUND—PRIOR ART

In commercial applications, isotope separation has most commonly been applied to uranium isotopes utilizing a centrifugal separation process. The helikon vortex has been applied to uranium isotope enrichment in South Africa utilizing a multi-stage cascade design (Feiverson, H. A., Glaser, A., Mian, Z., & Von Hippel, F. N., and Moore, J. D. L.), but has not been applied to the selective isotope separation of $CO_2$ from atmospheric gases in prior art.

Turner, et al., in U.S. Pat. No. 8,460,434, shows that a helikon vortex can be utilized as a centrifugal separator in a multi-stage cascade design as one part of a process to separate methane from landfill gas. Although the multi-stage cascade design of the helikon vortex can separate gases by molecular density, it was developed for the separation of uranium isotopes, which are very heavy and differ in mass by a small amount (i.e., $^{235}U$ and $^{238}U$, which differ in mass by 1.3%), which is one of the most challenging applications for centrifugal separation. Due to this multi-stage cascade design, it is very energy intensive to operate, and although it can be applied to the separation other gases by molecular density, it is uneconomical for the filtration of atmospheric gases on a large-scale for agricultural production.

Shacter, in U.S. Pat. No. 3,925,036, shows a method for cycling gases through a cascade of multiple stages to achieve the separation other gases by molecular density. This multi-stage cascade design was also intended for the separation of uranium isotopes, and due to the reasons noted above is very energy intensive to operate, and although it can be applied to the separation other gases by molecular density, it is uneconomical for the filtration of atmospheric gases on a large-scale for agricultural production.

Steimel, in U.S. Pat. No. 3,004,158, shows that a gas centrifuge can separate molecules of different masses by applying extremely high velocities while utilizing ionization of the gas with electric currents and the control of magnetic fields around the gas chamber. Although this process is effective for the separation of isotopes of heavy elements, such as uranium (i.e., $^{235}U$ and $^{238}U$, which differ in mass by 1.3%), it is very energy intensive to operate and the apparatus itself is complex to construct, including a large electromagnet, electrodes, and controlling mechanisms. While all of this may be essential for the difficult and energy intensive separation of heavy isotopes from each other (e.g., $^{235}U$ and $^{238}U$), the separation of carbon isotopes (e.g., $^{12}C$ and $^{14}C$, which differ in mass by 16.7%) is much less energy intensive, due to the relatively large mass difference between isotopes. Being more energy intensive than necessary for the desired application, this process is uneconomical for the filtration of atmospheric gases on a large-scale for agricultural production.

Gerber, in U.S. Pat. No. 3,594,573, shows that heavy and light isotopes can be separated from a fluid by applying a rotating electric field and ionization of the liquid with electrodes or a radioactive source. Although this process may have economical applications for liquids at atmospheric pressures, utilization of this process for the separation of $CO_2$ with $^{14}C$ from atmospheric gases would first require the separation of $CO_2$ from other atmospheric gases, the liquification of the removed $CO_2$, and then the application of the described process. After this, the $CO_2$ without $^{14}C$ would need then to be re-combined with atmospheric gases without $CO_2$. Together, with the added complexity of removing $CO_2$ from atmospheric gases, liquification of this gas, application of the described process, and then recombination of gases, this approach is uneconomical for the filtration of atmospheric gases on a large-scale for agricultural production.

Janes, in U.S. Pat. No. 3,939,354, shows that ions can be separated from a plasma source utilizing mass acceleration. Similarly, Drummond, et al., in U.S. Pat. No. 3,942,975, shows that matter can be converted by an arc heater into an ionized plasma in excess of 5,000° K and stabilized with magnetic fields. Although this process was developed for the separation of rare valuable elements, such as metals, these could be adapted to separate carbon isotopes from sources of carbon. Utilization of these methodologies for the separation of $CO_2$ with $^{14}C$ from atmospheric gases would first require the separation of $CO_2$ from other atmospheric gases, then application of the described process to the removed $CO_2$ (or conversion of some other carbon source to plasma) and then removal of $^{14}C$. After this, the carbon without $^{14}C$ would need to be combined with oxygen to produce $CO_2$, which would then need to be mixed with the atmospheric gases that had the $CO_2$ removed earlier. Together, with the added complexity of removing $CO_2$ from atmospheric gases, application of the described process, conversion of carbon to $CO_2$, and then recombination of gases, this appears to be an uneconomical alternative for the filtration of atmospheric gases on a large-scale for agricultural production. McKinney, et al., in U.S. Pat. No. 3,421,334, shows that isotopes of helium can be separated while in liquid form by exploiting unique physical properties of different isotopes. Although the claim was limited for use with helium, a similar approach could exploit the physical properties of $CO_2$ in a liquid state. This approach would be complicated by the fact $CO_2$ is a compound rather than an element and that there are three stable isotopes of oxygen (i.e., $^{16}O$, $^{17}O$, and $^{18}O$) that are naturally found in combinations with three naturally occurring isotopes of carbon (i.e., $^{12}O$, $^{13}C$, and $^{14}C$). Even so, exploiting the unique molecular weight of $^{12}C^{16}O_2$ in a liquid state would require the removal of $CO_2$ from atmospheric gases, application of this new process, and then recombination of the $CO_2$ without $^{14}C$ with the atmospheric gases without $CO_2$. Altogether, even if this claim were modified for this application, it would also appear to be an uneconomical alternative for the filtration of atmospheric gases to remove $^{14}C$ on a large-scale for agricultural production.

Russ, Fischer, and Crawford, in U.S. Pat. No. 7,332,715 (2008), shows that gas at an atmospheric pressure can be passed through an ionization chamber with an electrode that generates ions, which pass through an ion filter apparatus with voltage differentials, thereby performing mass spectrometry, which demonstrates one form of isotope separation. Although this process is useful for the identification and measurement of the molecular and isotopic constituents of a gas, it is not readily extensible or adaptable to the removal of one isotopic component of atmospheric gases on a large scale, since each molecule of atmospheric gas needs to be ionized prior to filtration.

Lashoda, et al, in U.S. Pat. No. 4,584,073, shows that isotopes of an element in a compound can be separated utilizing a laser when the compound is deposited in a monolayer on small glass beads. Although this process has useful applications, utilization of this process for separation of $CO_2$ with $^{14}C$ from atmospheric gases would first require the separation of $CO_2$ from all other atmospheric gases, the liquification of the removed $CO_2$, and then the application of the described process. After this, the $CO_2$ without $^{14}C$ would then need to be re-combined with atmospheric gases without $CO_2$. Together, with the added complexity of removing $CO_2$ from atmospheric gases, liquification of the removed $CO_2$ gas, application of the described process, and then recombination of gases, this approach is uneconomical for the filtration of atmospheric gases on a large-scale for agricultural production.

Several instances of prior art utilize condensation of gases or condensates as part of a system or method to remove isotopes. Redmann, in U.S. Pat. No. 4,638,674, shows that isotopes can be removed from a continuous stream of gas through condensation, although the claims are limited to gas streams from a nuclear plant rather than atmospheric gases. Similarly, Schweiger in U.S. Pat. No. 4,816,209, shows that radioactive tritium isotopes can be removed from gas from a nuclear reactor by utilizing condensation. These claims are also limited to gases from nuclear reactors.

Janner, et al., in U.S. Pat. No. 4,311,674, shows that one isotope component of gases can be selectively excited from a condensate using radiation from a laser. Utilization of this process for separation of $CO_2$ with $^{14}C$ from atmospheric gases would first require the condensation of $CO_2$ from all other atmospheric gases by increasing the pressure of the gases to exceed 5.1 bars, and then application of the described process. After this, the $CO_2$ without $^{14}C$ would then need to be re-combined with atmospheric gases without $CO_2$. Together, with the added complexity of removing $CO_2$ from atmospheric gases, liquification of the removed $CO_2$ gas, application of the described process, and then recombination of gases, this approach is uneconomical for the filtration of atmospheric gases on a large-scale for agricultural production.

Wikdahl, in U.S. Pat. No. 4,070,171, shows that gas mixtures can be separated by molecular or atomic weight by centrifugal force in a vortex. The described apparatus utilizes velocities exceeding the speed of sound and has been utilized for uranium isotope separation, which is among the most technically difficult isotope separation applications. This apparatus could be adapted for the less rigorous application of $^{14}C$ separation, although the small diameter limits the utility for the filtration of atmospheric gases on a large-scale for agricultural production, and effective $^{14}C$ separation can be achieved at lower velocities than those required for more demanding applications. Therefore, this apparatus would be less economical than an alternative that does not require such extremely high velocities, which limits efficiency, and such a small diameter, which limits the volume of throughput.

Mangadoddy, et al., in U.S. Pat. No. 9,579,666 B2, shows that dense medium can be separated by centrifugal force in a vortex. Although this apparatus appears very similar to Wikdahl's apparatus, as noted above, it has a larger diameter, is intended for the separation of particles rather than molecules, and is functional at lower velocities. Although this apparatus was not intended for isotope separation, and that subject is outside the scope of the claims, it could be modified and adapted for the application of separating $CO_2$ with $^{14}C$ from atmospheric gases. In conclusion, no method or process has been formerly developed for maintaining a controlled environment from which $CO_2$ with $^{14}C$ has either been removed or reduced to a lower level than the natural abundance of $^{14}C$, as required for growing agricultural products with reduced $^{14}C$ content. Similarly, no apparatus has been formerly developed with the specific intent to efficiently and economically remove $CO_2$ with $^{14}C$ from atmospheric gases with a single filtration pass, as required for large scale agricultural production.

SUMMARY

A process to grow agricultural products with a reduced abundance of radioactive $^{14}C$ will have health benefits by reducing harmful damage to human DNA, which has been correlated to cancer. Other benefits of reduced cumulative genetic damage over long periods of time have yet to be quantified. To-date, removal of $^{14}C$ from agricultural products on a large scale has not been possible due to a lack of an economical means to remove $^{14}C$ from $CO_2$ on a scale sufficient for agricultural production. Such agricultural products can be grown in a large variety of controlled environments so long as they are airtight, such as a sealed container, greenhouse, or building, and provided the other requirements for agricultural growth are also satisfied, such as light, water, and micronutrients. The controlled environment must be airtight so that the gases therein can be controlled and constitute filtered atmospheric gases from which $CO_2$ with $^{14}C$ has been removed. With the proper sensors, control valves, and control systems, 1) the abundance of $CO_2$ in the controlled environment can be automatically maintained by circulating atmospheric gases through the filtration system, operating control valves, and circulation of fresh filtered air through the controlled environment, 2) to ensure the quality of the agricultural products, the control system can also ensure the filtration system is effective prior to routing filtered atmospheric gases into the controlled environment, and 3) the air pressure inside the controlled environment can be maintained at a positive pressure with respect to the external atmospheric air pressure, to prevent any leakage that could contaminate the controlled environment. Together with hydroponic growing methodologies, this process enables the complete automation of large scale agricultural production with reduced $^{14}C$.

The bilateral and unilateral compression helikon vortex designs provide efficient, single-pass systems for the effective filtration of $^{14}C$ from $CO_2$ that is suitable for the filtration of large quantities of atmospheric gases as required for agricultural production (Patrick, A. D., & Patrick, B. E.). These designs are effective due to the relatively large mass difference between stable carbon and unstable carbon isotopes (i.e., $^{12}C$ and $^{14}C$, which differ in mass by 16.7%), which is much less energy intensive to separate than the typical subjects of nuclear isotope separation, i.e., the heavy element isotopes of uranium, such as $^{235}U$ and $^{238}U$, which differ in mass by 1.3% and require much more energy to separate. The designs also benefit from the fact unlike uranium, which is a scarce resource and cannot be wasted, atmospheric gases are relatively abundant and available for filtration at no material cost. Therefore, if a portion of perfectly usable air is lost as "waste" from the filtration process, there is no material cost for the separation process, and consequently, the filtration process does not require a high level of material efficiency to be successful or effective at removing $^{14}C$. The designs are simple without requiring electromagnets or electrodes for the ionization of gas, like some isotope separation methodologies. Also, many of the designs that utilize or require the ionization of gas are more complex and resource intensive to construct and operate. The single-pass system designs are also efficient without requiring a multi-stage cascade design, which requires many more resources to build than a single-pass filtration system, as well as much more energy to operate. The designs are more efficient in both design and operation than any of the designs that require liquification of the gases, or ionization of liquified gases, which introduce the process complexities of liquifying atmospheric gases, the maintenance hazards of operating with highly pressurized systems, and the recombination of filtered gases after liquification. The designs are also more efficient and economical than processes that would require converting $CO_2$ to plasma and stabilizing ionized plasma with magnetic fields. Since the designs only require the acceleration of atmospheric gases, they are also more efficient than processes that require ionization and processing of each molecule of gas in mixtures of gases being separated. Since the designs utilize atmospheric gases directly, they do not require condensation of gases from nuclear power plants or require the excitation of condensates by lasers, which would only add inefficiencies. The designs do not require the acceleration of gases to velocities exceeding the speed of sound, which is required for centrifugal gas separation methodologies applied to more technically difficult isotope separation applications. The designs also do not require the very small diameter of apparatus required by centrifugal gas separation systems intended for more technically challenging isotope separation applications. Since the designs are effective at lower velocities and larger diameters, they are more efficient and well suited for the high throughput of atmospheric gases volumes required for large scale agricultural production applications. The designs are not constrained by particulate separation, only the densities of atmospheric gases, and any particulates that enter the designs would generally be discarded with the high-density atmospheric gases, including the $CO_2$ with $^{14}C$. The designs are intended to efficiently and economically remove $CO_2$ with $^{14}C$ from atmospheric gases with a single-pass filtration, as required for large scale agricultural production.

DRAWINGS—FIGURES

FIG. 3 is a Unilateral Compression Helikon Vortex Overview, with a front view (FIG. 3a), top view (FIG. 3b), right-side view (FIG. 3c), and cross-section of the tangential airflow stabilizer (FIG. 3d).

FIG. 5 is a Wide Vortex Chamber with Tangential Input Overview, with a front view (FIG. 5a), back view (FIG. 5b), top view (FIG. 5c), and right-side view (FIG. 5d).

FIG. 14 is a Vortex Exhaust/Cone Alignment Base Overview, with a front view (FIG. 14a), top view (FIG. 14b), and bottom view (FIG. 14c).

DETAILED DESCRIPTION

Figure 1:
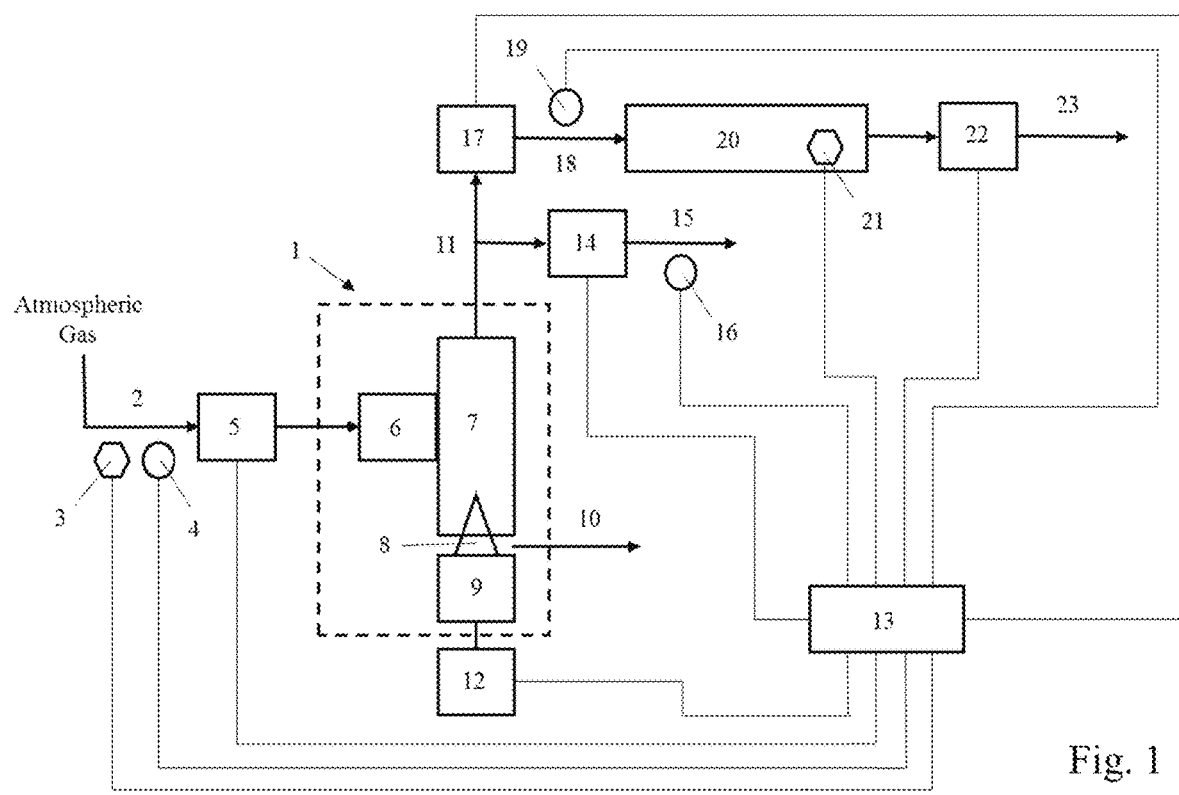
FIG. 1 is a Flow Diagram for the Separation of Atmospheric Gases to Remove $CO_2$ with $^{14}C$ Utilizing a Helikon Vortex and Control System.

FIG. 1. is a flow diagram for the separation of atmospheric gases to remove $CO_2$ with $^{14}C$ in accordance with the process, control system, and Helikon Vortex Bilateral and Unilateral Compression designs within the invention. The Helikon Vortex 1 (see FIG. 2 or FIG. 3 for details) constitutes a means to remove $CO_2$ with $^{14}C$ from the atmospheric gases 2. Several alternative processes or apparatus could substitute 1 in this flow diagram, with respective losses of efficiency as described in the background section, and constitute an alternative means to remove $CO_2$ with $^{14}C$ from 2. The atmospheric pressure $p_1$ of the atmospheric gases 2 is measured by pressure sensor 3 and $CO_2$ abundance $c_1$ in the atmospheric gases 2 is measured by $CO_2$ sensor 4, both of which are monitored by a control system 13. A commercial high-speed air blower 5, which can be activated by the control system 13, accelerates the atmospheric gases to velocity v and volume $V_0$ per second which is output directly into an airflow adapter 6 which is connected to the vortex chamber 7, into which the air is injected tangentially to maximize centrifugal acceleration. A cone 8 which is aligned with the vortex chamber 7 by the vortex exhaust/ cone alignment base 9. The position of the cone 8 can be raised or lowered relative to the vortex chamber 7 to reduce or widen the gap between the vortex chamber 7 and the cone 8. The positioning of the cone 8 to achieve the desired separation is hereafter referred to as calibration. Dense molecular gas 10 is forced to the outside of the vortex chamber 7 by centrifugal acceleration a and exits the vortex chamber 7 through the gap near the cone 8, where it is exhausted to the atmosphere, reentering the atmospheric gases 2. Low density molecular gas 11 with reduced $^{14}C$ content is slowed by the cone 8 and exits the vortex chamber opposite the cone at the top. The calibration (or cone position) can be adjusted by an electrical motor 12 which can raise or lower the cone 8 position relative to the vortex chamber 7 through axial rotation. Low density molecular gas 11 can exit through either manual or solenoid operated electrical control valves 14 and 17, which can be controlled by the control system 13. Control valve 14 is a relief valve which opens and releases gases while the high-speed blower 5 is starting, while the vortex chamber is pressurizing, or while the cone position is changing during calibration. $CO_2$ abundance $c_2$ of the relief valve gas output 15 is measured at $CO_2$ sensor 16 and monitored by the control system 13. Once the vortex chamber 7 is pressurized and $CO_2$ separation is adequate per the helikon vortex calibration, relief control valve 14 is closed and the vortex chamber control valve 17 is simultaneously opened by the control system 13. $CO_2$ separation is adequate when $CO_2$ sensor calibration adjusted measurements $c_2/c_1 < S$, where the required separation $S<1$, and S is dependent on the efficiency of the helikon vortex. While the vortex chamber control valve 17 (i.e., the control valve for gaseous input to the controlled environment) is open, the $CO_2$ abundance $c_3$ of the vortex chamber control valve output 18 is monitored by $CO_2$ sensor 19 to ensure $CO_2$ separation is adequate, per the helikon vortex calibration, and proper operation of the vortex. $CO_2$ separation is adequate when $CO_2$ sensor calibration adjusted measurements $c_3/c_1 < S$. The vortex chamber control valve output 18 passes directly into a controlled environment 20 which can be used for applications requiring $CO_2$ with reduced $^{14}C$ content (e.g., agricultural production applications). The pressure $p_2$ of gases inside the controlled environment 20 is measured by a pressure sensor 21 and monitored by the control system 13 with to ensure a positive pressure (i.e., $p_2 > p_1$) is maintained inside the controlled environment 20 to preclude contamination with $CO_2$ containing $^{14}C$ in the event of a leak or rupture. Control valve 22 remains closed while $p_2 < p_1$ when 17 is open until 20 has a positive pressure differential over the atmospheric pressure (as determined by comparing pressure sensors 3 and 21), or $p_2 > p_1 + p_0$, where $p_0$ is the minimum additional pressure required by 20, to ensure atmospheric gases 2 do not enter 20 through 22. When control valve 17 is open and a sufficient positive pressure exists in the controlled environment 20, or $p_2 > p_1 + p_0$, control valve 22 will be opened by the control system 13, allowing controlled environment gases 23 to exit through 22, where it is exhausted to the atmosphere, reentering atmospheric gases 2. Control valve 22 may also be opened by 13 when atmospheric pressure $p_1$ decreases so that $p_2 > p_1 + 2*p_0$, as an emergency relief, to ensure the pressure in 20 is not so high that controlled environment gases 23 do not enter 7 through 17 when 17 is opened. When $p_1$ is rising, 13 can also turn on 5 to increase $p_2$ to maintain a positive pressure in 20; as described above, 5 pressurizes 7, whereby 17 is opened, increasing $p_2$. When $CO_2$ abundance decreases in 20 due to utilization or consumption by applications, as measured by $c_3$, and $c_3 < c_0$, where $c_0$ is the minimum $CO_2$ abundance required by 20, 13 will turn on 5 to replace the controlled environment gases in 20. In this manner, 13 can regulate both the pressure and $CO_2$ abundance in the controlled environment 20 as the natural atmospheric pressure $p_1$ of 2 fluctuates and $CO_2$ with reduced $^{14}C$ content is utilized in 20. The control system 13 can either be programmed or configured to operate 5, 14, 17, and 22 utilizing electronic controls or switches with digital or analog signals, constituting a means to operate the blower and control valves. Similarly, 13 can either be programmed or configured to monitor digital or analog signals from 3, 4, 16, 19, and 21, constituting a means to monitor the sensors.

Figure 2A:
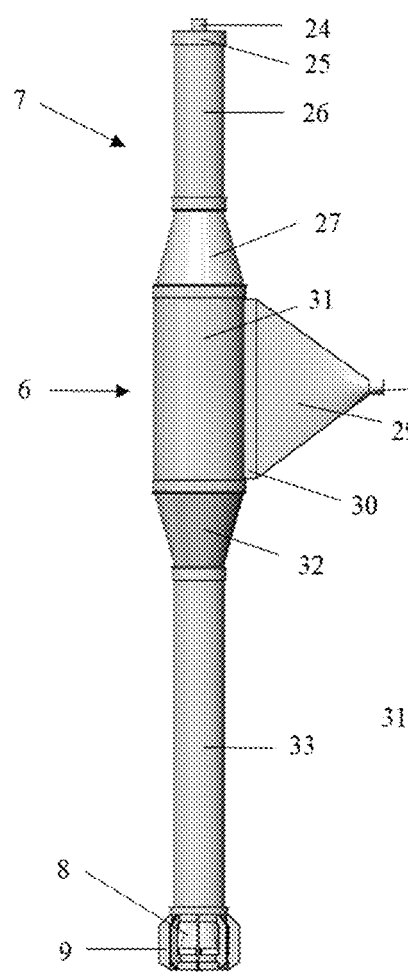
FIG. 2 is a Bilateral Compression Helikon Vortex Overview, with a front view (FIG. 2a), top view (FIG. 2b), right-side view (FIG. 2c), and cross-section of the tangential airflow stabilizer (FIG. 2d).
Figure 2B:
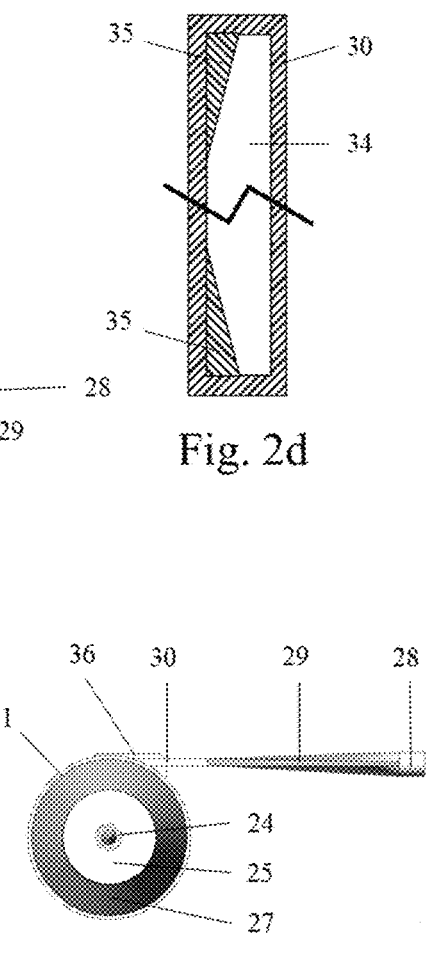
Figure 2C:
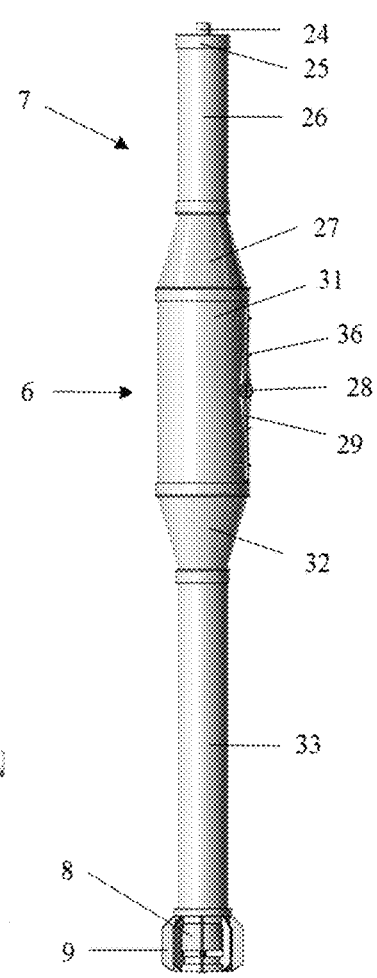

FIG. 2 is a Bilateral Compression Helikon Vortex Overview, with a front view (FIG. 2a), top view (FIG. 2b), and right-side view (FIG. 2c), and cross-section of the tangential airflow stabilizer (FIG. 2d). This assembly is one instantiation of the helikon vortex 1 in FIG. 1, and several components from FIG. 1 are recognizable here, including the airflow adapter 6, helikon vortex chamber 7, cone 8, and helikon vortex exhaust/cone alignment base 9. The vortex output adapter 24 is where $CO_2$ with reduced $^{14}C$ content is output, and this is attached to the narrow vortex chamber cap/outlet 25, which is on top of 7. The vortex chamber consists of the upper narrow vortex chamber 26, extends through the center of the upper lateral vortex chamber adapter 27, the center of the airflow adapter 6, the center of the lower lateral vortex chamber adapter 32, and the lower narrow vortex chamber 33. The upper and lower narrow vortex chambers have an interior radius of $r_1$ and combined height of $h_1$, where the height of 26 is less than or equal to half the height of 33. The airflow adapter 6 consists of several components identifiable here, including the blower input connector 28, radial to tangential airflow adapter 29, tangential airflow stabilizer 30, and the wide vortex chamber with tangential input 31. The wide vortex chamber has an interior radius of $r_2$ and height of $h_2$, and is connected to the narrow vortex chambers 26 and 33 of interior radius $r_1$ by 27 and 32, each with a height $h_3$. The blower input connector 28 is a circular adapter with an interior radius of $r_0$ and thickness of $t_0$ for an exterior radius of $r_0+t_0$, providing a cross-section area of $\pi r_0^2$ for $V_0$ per second of input from the high-speed blower 5. The radial to tangential airflow adapter 29 changes the radial airflow at 28 to a vertical stream at the tangential airflow stabilizer 30 with an interior stream height of $h_0$, a maximum width of $w_0$ where $\pi r_0^2 \geq h_0 w_0$. The stream cross-section 34 can be compressed to increase pressure in the vortex chamber or to achieve a higher input velocity based on the performance of 5. The stream can also be tapered or shaped at the top and bottom excluding wedges from the tangential airflow 35 of height $h_4$ and width $w_1$ from the tangential edge closest to the center of the vortex chamber (See FIG. 2d), where $h_4 \leq h_0/2$ and $w_1 < w_0$, yielding a cross section area of $h_0 w_0 - h_4 w_1 \leq \pi r_0^2$, to evenly distribute pressure in 31 as gases are compressed in 27 and 32. Below the vortex chamber 7, the cone 8 is held in a position aligned with the center of 7 by the helikon vortex exhaust/cone alignment base 9 which is attached to the bottom of 33. The position of 8 can be adjusted for calibration of the helikon vortex while remaining in alignment with the lower narrow vortex chamber 33. The top view (FIG. 2b) obstructs components below 31, but shows reinforcement for the tangential airflow 36, which is also visible on the right-side view (FIG. 2c). The interior volume of the Bilateral Compression Helikon Vortex as defined is $$V = \pi r_1^2 h_1 + \pi r_2^2 h_2 + 2\pi(r_1^2 + r_1 r_2 + r_2^2) h_3 / 3.$$

FIG. 3 is a Unilateral Compression Helikon Vortex Overview, with a front view (FIG. 3a), top view (FIG. 3b), and right-side view (FIG. 3c), and cross-section of the tangential airflow stabilizer (FIG. 3d). This assembly is one instantiation of the helikon vortex 1 in FIG. 1, and several components from FIG. 1 are recognizable here, including the airflow adapter 6, helikon vortex chamber 7, cone 8, and helikon vortex exhaust/cone alignment base 9. The vortex output adapter 24 is where $CO_2$ with reduced $^{14}C$ content is output, and this is attached to the wide vortex chamber cap/outlet 37, which is on top of 6. The vortex chamber consists of the lower narrow vortex chamber 33, and extends through the lower lateral vortex chamber adapter 32, and the center of the airflow adapter 6. The lower narrow vortex chamber has an interior radius of $r_1$ and height of $h_1$. The airflow adapter 6 consists of several components that are identifiable here, including the blower input connector 28, radial to tangential airflow adapter 29, tangential airflow stabilizer 30, and the wide vortex chamber with tangential input 31. The wide vortex chamber has an interior radius of $r_2$ and height of $h_2$, and is connected to the narrow vortex chamber 33 of interior radius $r_1$ by 32, with a height $h_3$. The blower input connector 28 is a circular adapter with an interior radius of $r_0$ and thickness of $t_0$ for an exterior radius of $r_0+t_0$, providing a cross-section area of $\pi r_0^2$ for $V_0$ per second of input from the high-speed blower 5. The radial to tangential airflow adapter 29 changes the radial airflow at 28 to a vertical stream at the tangential airflow stabilizer 30 with an interior stream height of $h_0$, a maximum width of $w_0$ where $\pi r_0^2 \geq h_0 w_0$. The stream cross-section 34 can be compressed to increase pressure in the vortex chamber or to achieve a higher input velocity based on the performance of 5. The stream can also be tapered or shaped at the bottom excluding a wedge from the tangential airflow 35 of height $h_4$ and width $w_1$ from the tangential edge closest to the center of the vortex chamber (See FIG. 3d), where $h_4 \leq h_0/2$ and $w_1 < w_0$, yielding a cross section area of $h_0 w_0 - h_4 w_1/2 \leq \pi r_0^2$, to evenly distribute pressure in 31 as gases are compressed in 32. Below the vortex chamber 7, the cone 8 is held in a position aligned with the center of 7 by the helikon vortex exhaust/cone alignment base 9 which is attached to the bottom of 33. The position of 8 can be adjusted for calibration of the helikon vortex while remaining in alignment with the lower narrow vortex chamber 33. The top view (FIG. 3b) obstructs components below 31, but shows reinforcement for the tangential airflow 36, which is also visible on the right-side view (FIG. 3c).

The interior volume of the Unilateral Compression Helikon Vortex as defined is $$V = \pi r_1^2 h_1 + \pi r_2^2 h_2 + \pi(r_1^2 + r_1 r_2 + r_2^2) h_3 / 3.$$

Figure 4A:
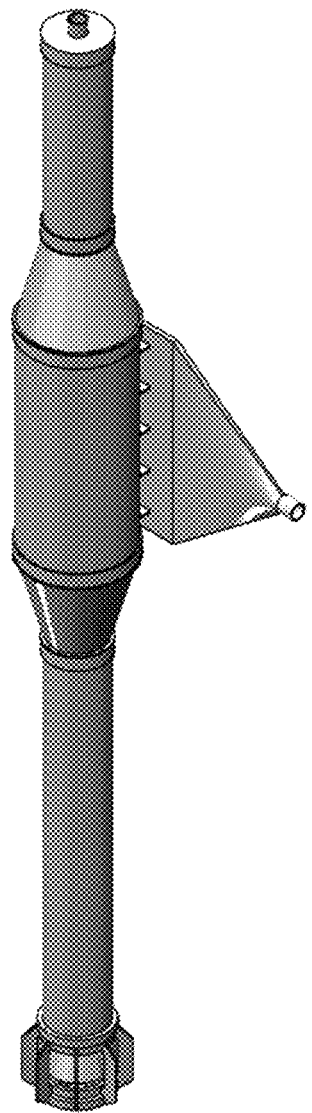
FIG. 4 is a Perspective View of a Bilateral Compression Helikon Vortex (FIG. 4a) and a Perspective View of a Bilateral Compression Helikon Vortex (FIG. 4b).
Figure 4B:
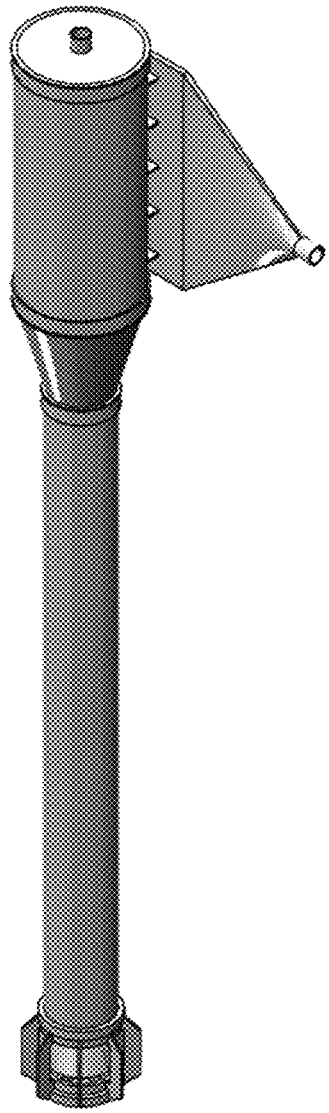

FIG. 4 is a Perspective View of a Bilateral Compression Helikon Vortex (FIG. 4a) and a Perspective View of a Bilateral Compression Helikon Vortex (FIG. 4b).

FIG. 5 is a Wide Vortex Chamber with Tangential Input Overview, with a front view (FIG. 5a), back view (FIG. 5b), top view (FIG. 5c), and right-side view (FIG. 5d). On all four views, the blower input connector 28, the radial to tangential airflow adapter 29, and the wide vortex chamber with tangential input 31 are visible. On all but the right-side view, the tangential airflow stabilizer 30 is visible. Cross-sections of 30 are provided in FIGS. 2d and 3d, detailing the interior cross-section area of the tangential airflow stabilizer 34 and variable exclusion wedges 35 detailed above, as related to the radius $r_0$ of 28. The outer reinforcement for the tangential airflow 39 are clearly seen on FIG. 5b, FIG. 5c, and FIG. 5d. These are evenly spaced vertically and centered around the input axis of 28, providing reinforcement for both 30 and 31 near the tangential input. The inner reinforcement for the tangential airflow 40 are seen on FIG. 5c and FIG. 5d, and are also evenly spaced vertically and centered around the input axis of 28, providing reinforcement for both 30 and 31 near the tangential input.

Figure 6:
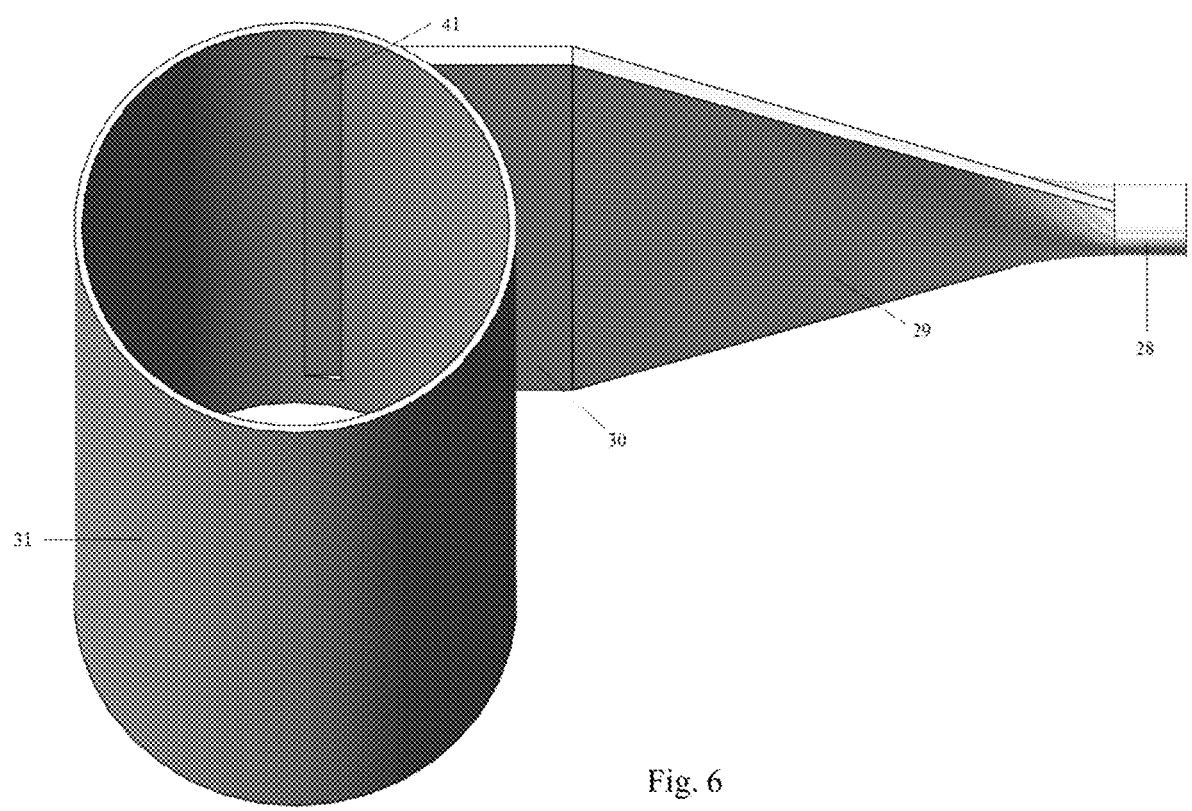
FIG. 6 is a Perspective View of a Wide Vortex Chamber with Tangential Input.

FIG. 6 is a Perspective View of a Wide Vortex Chamber with Tangential Input. From this front-upper perspective view the tangential airflow vent 41 is visible inside 31, which was not visible from any of the four views on FIG. 5. As illustrated in FIG. 6, 41 has tangential dimensions with a height of $h_0$ and width of $w_0$ and is configured for either a bilateral or unilateral helikon vortex configuration with $h_4=0$ and $w_1=0$, omitting any exclusion wedges (i.e., 35) from the tangential airflow. The airflow adapter 6, as seen on FIGS. 1, 2, and 3, utilizes 28, 29, 30, and 35, as seen on FIGS. 2 and 3, to constitute a means to stabilize and shape the airflow of said atmospheric gases 2 into 34, as seen on FIGS. 2 and 3, prior to passing through 41 into 31, as seen here on FIG. 6.

Figures 7A, 7B:
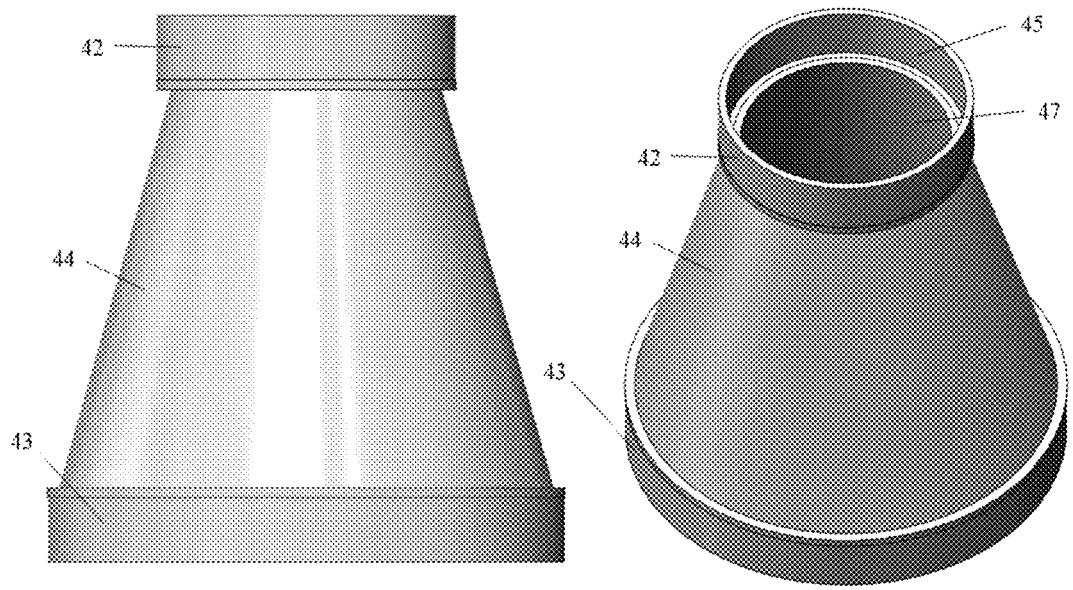
FIG. 7 is a Lateral Vortex Chamber Adapter Overview, with a front view (FIG. 7a), upper-front perspective view (FIG. 7b), and lower-front perspective view (FIG. 7c).
Figure 7C:
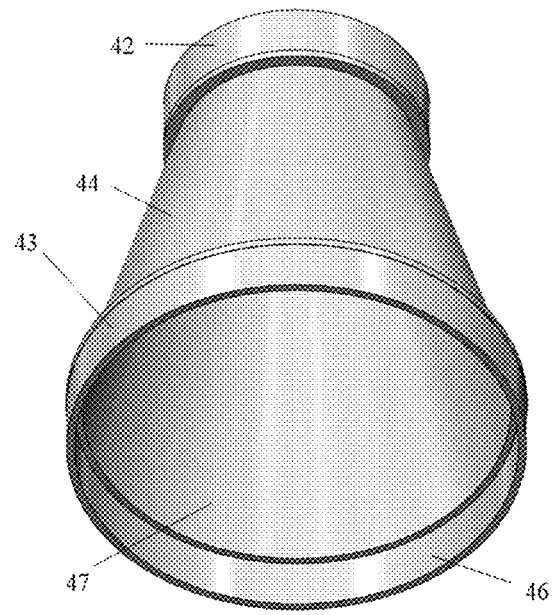

FIG. 7 is a Lateral Vortex Chamber Adapter Overview, with a front view (FIG. 7a), upper-front perspective view (FIG. 7b), and lower-front perspective view (FIG. 7c). The lateral vortex chamber adapter is utilized twice in the bilateral compression helikon vortex configuration 27 and 32, and once in the unilateral compression helikon vortex configuration 32. The lateral adapter 44 connects to a wide vortex chamber 32 with a wide vortex chamber connector 42 and connects to a narrow vortex chamber to a narrow vortex chamber 26 or 33 with a narrow vortex chamber connector 43. As illustrated in FIG. 7b, the interior of the narrow vortex chamber connector 45 has a radius equal to the outside radius of the narrow vortex chamber (See FIG. 8). The interior of the lateral adapter 47 is a smooth surface in the shape of a truncated cone and has a radius of $r_1$ at the minimum radius at the edge shared with 45. The interior of the wide vortex chamber connector 46 has a radius equal to the outside radius of the wide vortex chamber 31. The maximum radius of 47 is equal to $r_2$ at the edge shared with 46. Thereby, 47 provides a smooth surface inside the vortex chamber of height $h_3$ between 45 and 46 for the compression of gases for separation by centrifugal acceleration while connecting wide and narrow vortex chamber components.

Figure 8A:
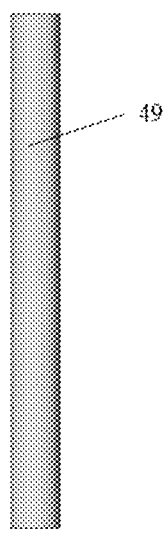
FIG. 8 is a Narrow Vortex Chamber Overview, with a front view (FIG. 8a), top view (FIG. 8b), and upper-front perspective view (FIG. 8c).
Figure 8B:
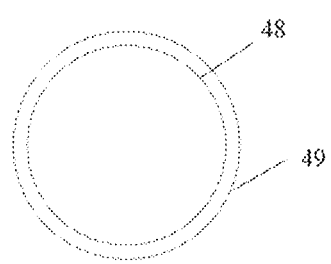
Figure 8C:
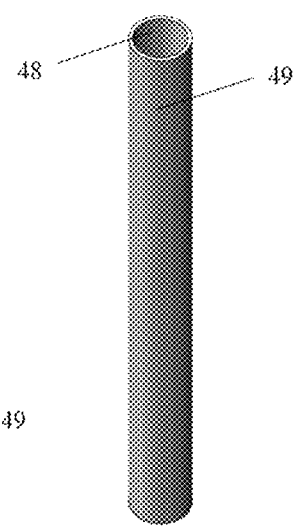

FIG. 8 is a Narrow Vortex Chamber Overview, with a front view (FIG. 8*a*), top view (FIG. 8*b*), and upper-front perspective view (FIG. 8*c*). The narrow vortex chamber is utilized twice in the bilateral compression helikon vortex configuration 26 and 33, and once in the unilateral compression helikon vortex configuration 33. To reduce helikon vortex manufacturing costs, commercial pipe with standard inner and outer diameters can be utilized for narrow vortex chambers by sizing the connectors on all connecting components, including 9, 25, 27, and 32, to match the outer and inner diameters of standard commercial pipe(s). For instance, the interior diameter of narrow vortex chamber connector 45 must match the outer diameter of the exterior of the narrow vortex chamber 49, and the minimum interior diameter of 47 must match the interior diameter of 48. An example of adapting a commercial pipe would be a 3 inch Schedule 40 PVC pipe, in which case the outer diameter of 49 would be 88.9 mm and the interior diameter of 48 would be 76.2 mm. Any commercial pipes must be cleaned with solvents and in the case of plastic or related synthetic polymers (e.g., polyvinyl chloride), they must be rigid and the interior of the narrow vortex chamber 48 must be coated with an antistatic treatment prior to utilization.

Figure 9C:
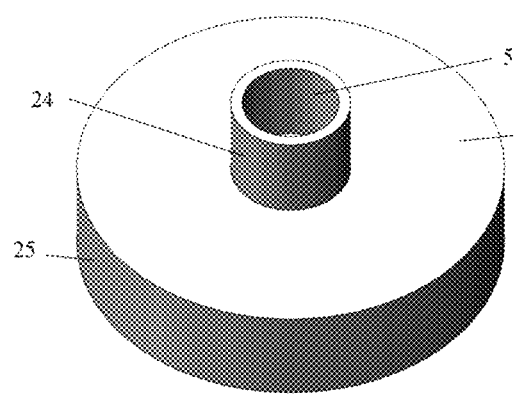
FIG. 9 is a Narrow Vortex Chamber Cap/Outlet Overview, with a front view (FIG. 9a), top view (FIG. 9b), upper-front perspective view (FIG. 9c), and lower-front perspective view (FIG. 9d).
Figure 9D:
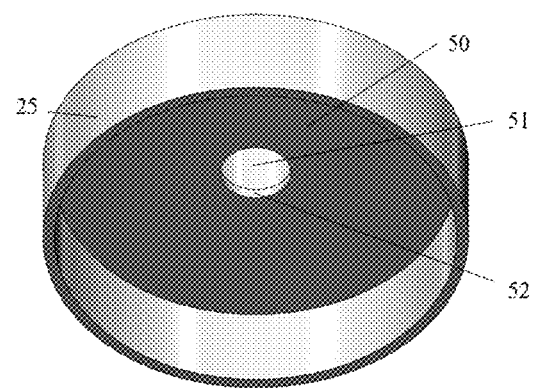
Figure 9A:
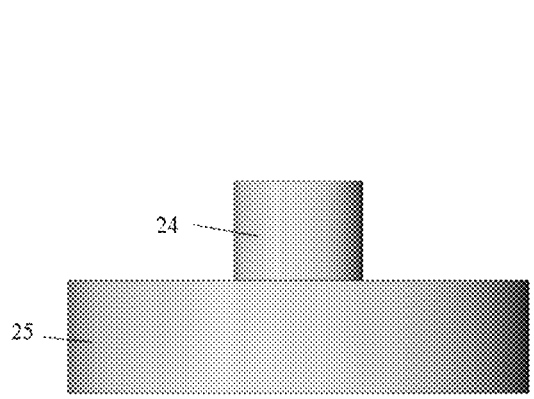
Figure 9B:
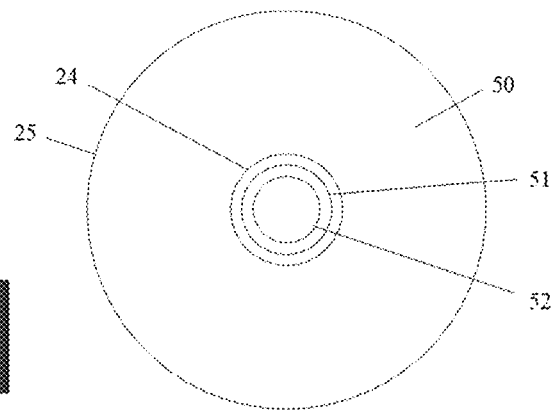

FIG. 9 is a Narrow Vortex Chamber Cap/Outlet Overview, with a front view (FIG. 9*a*), top view (FIG. 9*b*), top upper-front perspective view (FIG. 9*c*), and lower-front perspective view (FIG. 9*d*). The narrow vortex chamber cap/outlet 25 is utilized in the bilateral compression helikon vortex, and the vortex output adapter 24 is visible in FIG. 9*a*, FIG. 9*b*, and FIG. 9*c*. The top of the narrow vortex chamber cap 50 is visible on FIG. 9*b* and FIG. 9*c*. To reduce helikon vortex manufacturing costs, the interior dimensions of the vortex output adapter 24 are intended to connect to commercial pipe with standard inner and outer diameters. The interior of vortex output adapter 51, visible in FIG. 9*b*, FIG. 9*c*, and FIG. 9*d*, has a diameter matching the outer diameter of a commercial pipe, while the vortex chamber cap outlet 52, visible in FIG. 9*b* and FIG. 9*d*, has a diameter matching the interior diameter of the same matching commercial pipe. E.g., when connecting 24 to a ½ inch Schedule 40 PVC pipe, the matching dimensions for 51 would be a diameter of 21.33 mm and 52 would be a diameter of 15.80 mm. The bottom of 50 is visible in FIG. 9*d*, which must be a smooth anti-static surface, like the other interior components of the helikon vortex.

Figures 10C, 10D:
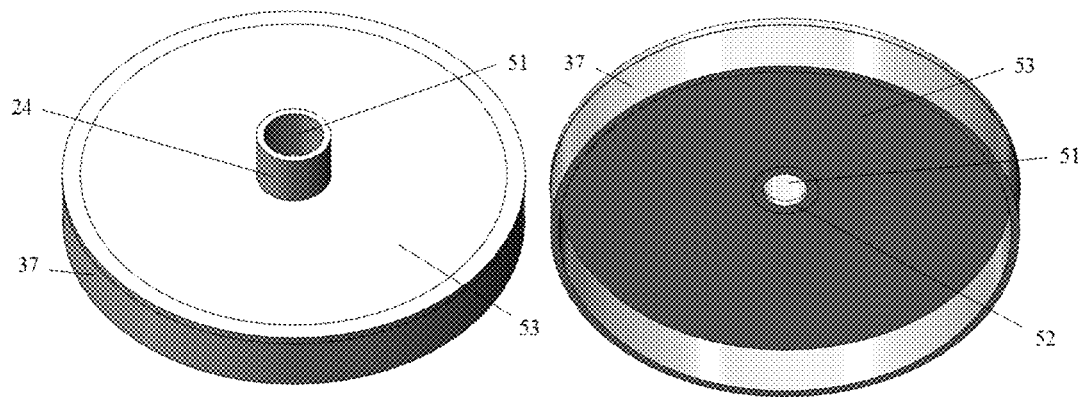
FIG. 10 is a Wide Vortex Chamber Cap/Outlet Overview, with a front view (FIG. 10a), top view (FIG. 10b), upper-front perspective view (FIG. 10c), and lower-front perspective view (FIG. 10d).
Figures 10A, 10B:
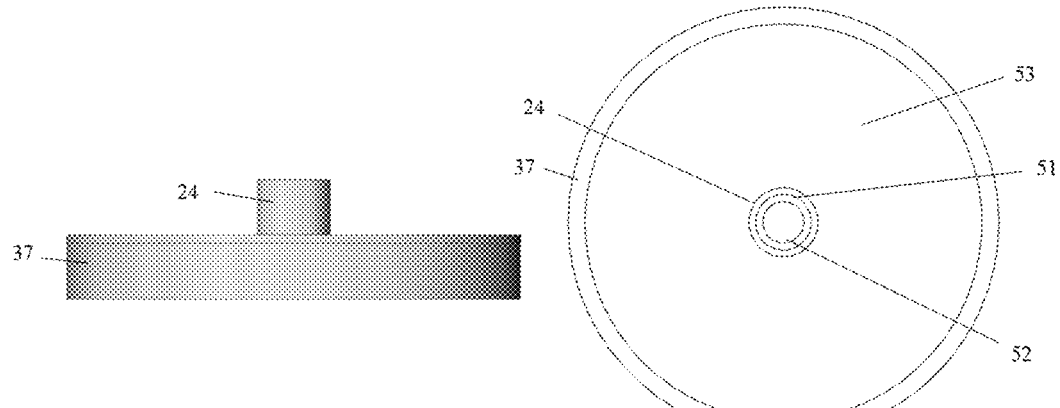

FIG. 10 is a Wide Vortex Chamber Cap/Outlet Overview, with a front view (FIG. 10*a*), top view (FIG. 10*b*), top upper-front perspective view (FIG. 10*c*), and lower-front perspective view (FIG. 10*d*). The wide vortex chamber cap/outlet 37 is utilized in the unilateral compression helikon vortex, and the vortex output adapter 24 is visible in FIG. 10*a*, FIG. 10*b*, and FIG. 10*c*. The top of the wide vortex chamber cap 53 is visible on FIG. 10*b* and FIG. 10*c*. To reduce helikon vortex manufacturing costs, the interior dimensions of the vortex output adapter 24 are intended to connect to commercial pipe with standard inner and outer diameters. The interior of vortex output adapter 51, visible in FIG. 10*b*, FIG. 10*c*, and FIG. 10*d*, has a diameter matching the outer diameter of a commercial pipe, while the vortex chamber cap outlet 52, visible in FIG. 10*b* and FIG. 10*d*, has a diameter matching the interior diameter of the matching commercial pipe. E.g., when connecting 24 to a ½ inch Schedule 40 PVC pipe, the matching dimensions for 51 would be a diameter of 21.33 mm and 52 would be a diameter of 15.80 mm. The bottom of 53 is visible in FIG. 10*d*, which must be a smooth anti-static surface, like the other interior components of the helikon vortex.

Figure 11A:
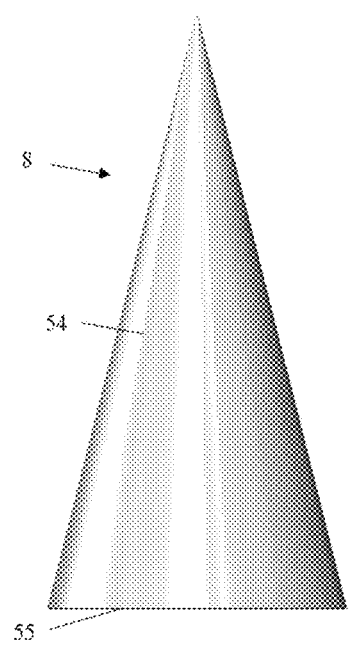
FIG. 11 is a Manually Calibrated Helikon Vortex Cone Overview, with a front view (FIG. 11a), top view (FIG. 11b), and lower-front perspective view (FIG. 11c).
Figure 11B:
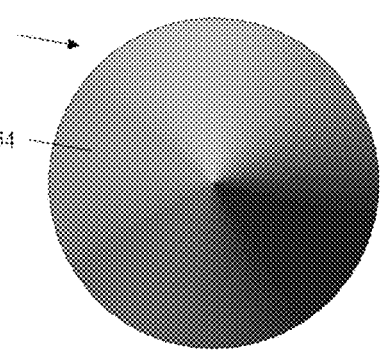
Figure 11C:
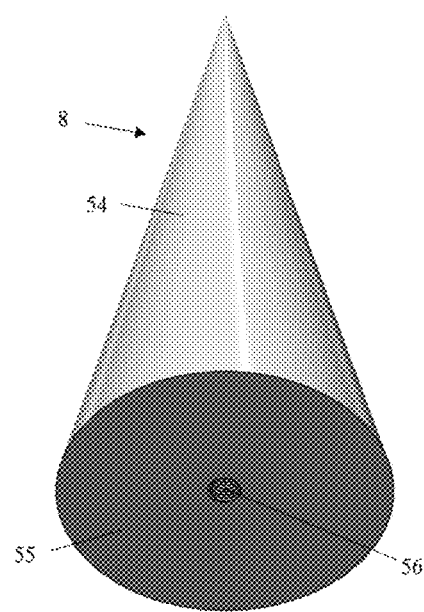

FIG. 11 is a Manually Calibrated Helikon Vortex Cone Overview, with a front view (FIG. 11*a*), top view (FIG. 11*b*), and lower-front perspective view (FIG. 11*c*). The manually calibrated helikon vortex cone is one instantiation of 8 which can be utilized in either Bilateral or Unilateral Helikon Vortex configurations. The effective surface of the cone 54 is visible in FIG. 11*a*, FIG. 11*b*, and FIG. 11*c*. This surface must be a smooth anti-static surface, like the other interior components of the helikon vortex. The base of the cone 55 is visible in FIG. 11*a* and FIG. 11*c*. In the center of the base of the cone is the threaded core of the cone 56 which is visible in FIG. 11*c*. To reduce helikon vortex manufacturing costs, the threads are industry standard fine thread count and diameter so that the manually calibrated helikon vortex cone can be used with industry standard bold sizes. E.g., an industry standard ⅜" bolt size has a fine thread count of 24 threads per inch (TPI).

Figure 12A:
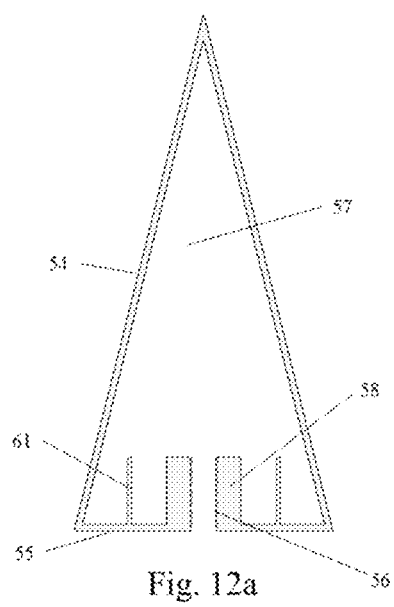
FIG. 12 is a Vertical Cross-Section View of the Manually Calibrated Helikon Vortex Cone (FIG. 12a), and a Horizontal Cross-Section View of the Manually Calibrated Helikon Vortex Cone (FIG. 12b).
Figure 12B:
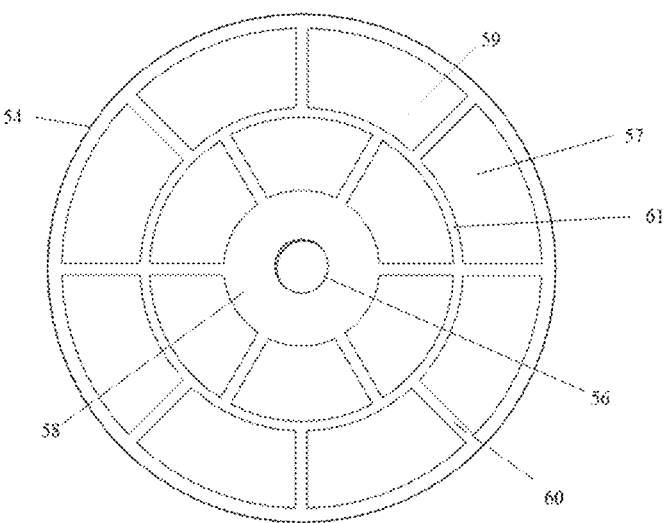

FIG. 12 is a Vertical Cross-Section View of the Manually Calibrated Helikon Vortex Cone (FIG. 12*a*), and a Horizontal Cross-Section View of the Manually Calibrated Helikon Vortex Cone (FIG. 12*b*). The effective surface of the cone 54 is visible in FIG. 12*a* on the upper external surface of the vertical cross-section, while the base of the cone 55 is visible on the bottom. The effective surface of the cone 54 is visible in FIG. 12*b* on the outer circumference of the horizontal cross-section. The threaded core of the cone 56 is visible on FIGS. 12*a* and 12*b*. To reduce helikon vortex manufacturing costs, the interior of the cone 57 is hollow, as seen on FIGS. 12*a* and 12*b*, precluding the utilization of unnecessary materials. The base of the cone is reinforced in three ways. First, a thick area of material reinforcement for the threaded core 58 is provided around 56, as seen on FIGS. 12*a* and 12*b*. Second, radial reinforcement structures 59 and 60 extend from 58 (i.e., near the center of the cone) to 54 (i.e., the outside of the cone), as seen on FIG. 12*b*. Third, and finally, a circular reinforcement structure 61 goes around the base of the cone and 56, as seen on FIGS. 12*a* and 12*b*, connecting the inner radial reinforcement structures 59 to the outer reinforcement structures 60. The inner and outer reinforcement structures, 59 and 60, are distributed at even intervals of angles around the central axis of the cone, but the angles separating structures for 59 and 60 are not necessarily equal, as seen on FIG. 12*b*, where six 59 are connected to 61 and eight 60 structures are connected to 61. Larger cones may have multiple circular reinforcements 61, in concentric circles, each connected by radial reinforcement structures, such as 59 or 60, while smaller cones may not require a circular reinforcement structure 61 and only a single set of radial reinforcement structures, such as 59, which would then directly connect 58 to 54.

Figure 13A:
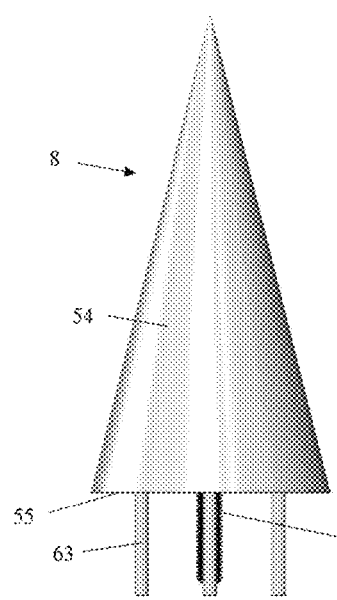
FIG. 13 is an Alternative Threaded Cone Overview, with a front view (FIG. 13a), bottom view (FIG. 13b), and lower-front perspective view (FIG. 13c).
Figure 13B:
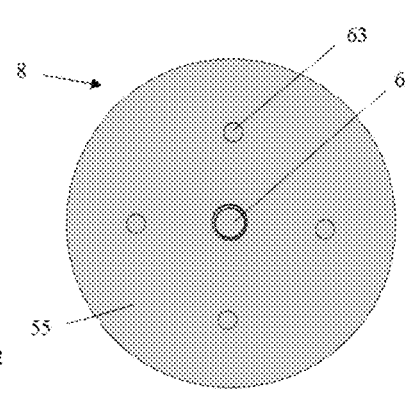
Figure 13C:
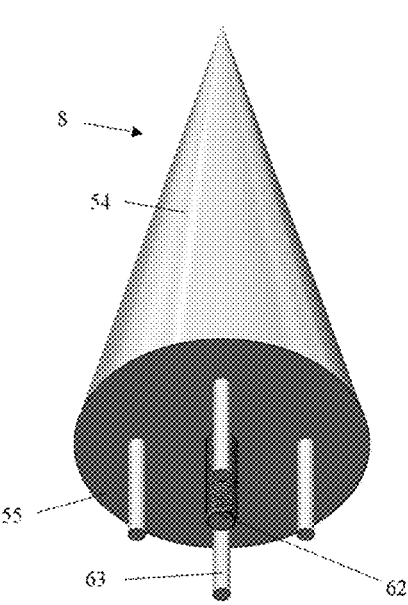

FIG. 13 is an Alternative Threaded Cone Overview, with a front view (FIG. 13*a*), bottom view (FIG. 13*b*), and lower-front perspective view (FIG. 13*c*). The alternative threaded cone differs from the manually calibrated helikon vortex cone in FIG. 11 in that it has no threaded core 56 and instead has a single threaded extrusion 62 and multiple axial alignment extrusions 63, as seen on FIGS. 13*a*, 13*b*, and 13*c*. The extrusions 62 and 63 are aligned with the central axis of the cone, with 62 being on the central axis as seen from the bottom view in FIG. 13*b*. One or more axial alignment extrusions, 63, appear around the central axis, with four visible on FIGS. 13*b* and 13*c*. The alternative threaded cone is intended for use with an electric motor 12 and the vortex exhaust/alternative threaded cone alignment base on FIGS. 15 and 16.

FIG. 14 is a Vortex Exhaust/Cone Alignment Base Overview, with a front view (FIG. 14*a*), top view (FIG. 14*b*), and bottom view (FIG. 14*c*). The vortex exhaust/cone alignment base 9 is utilized with the cone 8 illustrated in FIG. 11 and has several critical functions. First, the bottom of the base 64, visible on FIGS. 14*a*, 14*b* and 14*c*, is held perpendicular to the central axis of the lower vortex chamber 7 via the connector to the vortex chamber 65, visible on FIGS. 14*a* and 14*b*, which attaches to the lower narrow vortex chamber 33. The inner diameter of 65 matches the outer diameter of 33 for alignment, and is large enough for the base of the cone 8 to be lowered into 9. Second, two or more vertical vent fins 66, visible on FIGS. 14*a*, 14*b*, and 14*c*, are symmetrically distributed around the central axis of 9, connecting 64 to 65, while being tangential to airflow from 33. The gaps between 66 permit exhaust to exit from the vortex chamber 9. Third, the bottom of the base 64 is structurally reinforced to hold the cone 8 in alignment with the central axis of the lower vortex chamber 7 with one or more circular reinforcements 67, visible on FIGS. 14*a* and 14*b*, symmetrically distributed radial reinforcements 68, visible on FIG. 14*b*, and a central reinforcement 69, visible on FIG. 14*b*, around the center of 64. The structural reinforcements 67, 68, and 69 support the alignment of the cone 8 while precluding the utilization of unnecessary materials. At the top of the base, 65 is contoured to maximize surface area with 66 to add structural strength. The cone is held in place by a commercial hex that is inserted from the bottom of 64 into the cylindrical hollow central shaft of the base 70, visible on FIGS. 14*b* and 14*c*. The hex head of the bolt fits into the base hex nut intrusion 71 which is visible on FIG. 14*c*. Therefore, the manually calibrated helikon vortex cone 8, in FIG. 11, can be attached to this vortex exhaust/cone alignment base 9, in FIG. 14, with a commercial hex bolt. The cone can be lowered by turning it clockwise, from the top view, down onto the threaded bolt, and raised by turning it counter-clockwise. When the cone is in a lower position there is a larger gap between the cone 8 and the lower narrow vortex chamber 33, allowing a larger volume of atmospheric gases to exhaust out of 7. These exhaust gases, which exit below 65 on FIG. 14*a* between the vent fins 66, are the densest atmospheric gases, being on the outside perimeter of 7 while under centrifugal acceleration.

Figure 15A:
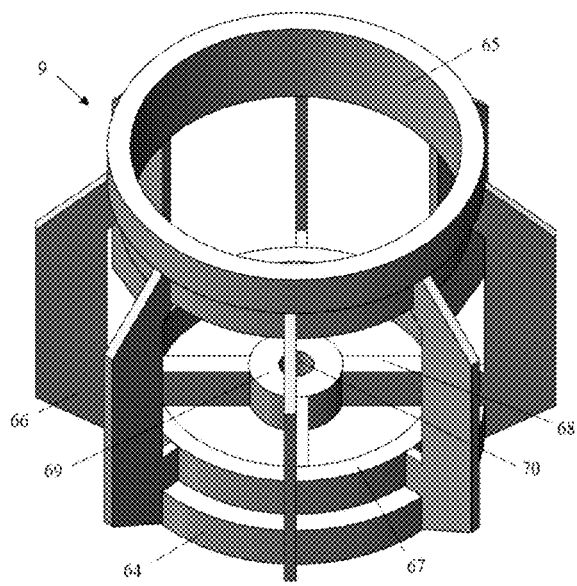
FIG. 15 is a Perspective View of the Vortex Exhaust/Cone Alignment Base, with an upper-front perspective view (FIG. 15a) and a lower-front view perspective view (FIG. 15b).
Figure 15B:
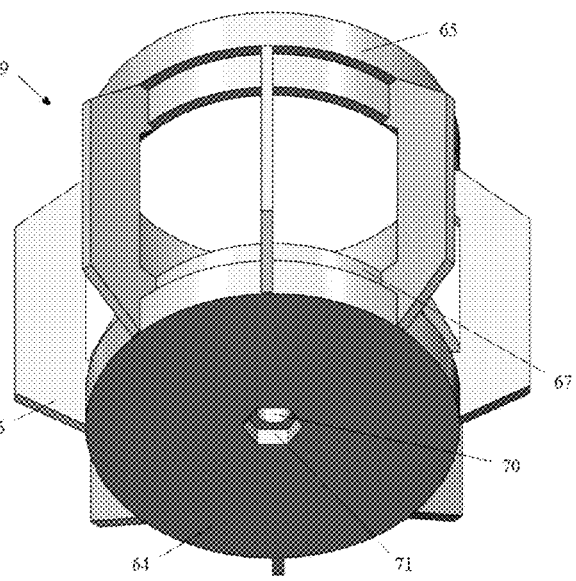

FIG. 15 is a Perspective View of the Vortex Exhaust/Cone Alignment Base, with an upper-front perspective view (FIG. 15*a*) and a lower-front view perspective view (FIG. 15*b*). All the reference numerals in FIG. 14 are visible in FIG. 15. On FIG. 15*a*, the circular and radial structural supports 67 and 68 can be seen to rise above the base 64, providing reinforcement to 69. The outermost circular structural support 67 also provides more surface area and structural support for 66 to attach to the base 64. The intrusion for the hex bolt 71 can be clearly seen on FIG. 15*b* in the center of the base 64. The variable outer diameter of 65 can also be seen on FIG. 15*b*, reducing materials required for construction while enhancing the surface are and structural support for 66 to attach to the connector 65. The vortex exhaust/cone alignment base 9 utilizes a hex bolt held stationary in axial alignment by 69, 70, and 71, and held in alignment with the lower narrow vortex chamber 33, as seen on FIGS. 2 and 3, by 65 and a plurality of 66, while said hex bolt is threaded into cone 8 holding 8 in axial alignment by 56 and 58, which are reinforced by 61 and a plurality of 59 and 60, as seen on FIG. 12, while 8 can be rotated clockwise and counter-clockwise to raise and lower position of 8 inside 33, constitutes a means to position said cone 8 inside said lower narrow vortex chamber 33.

Figure 16A:
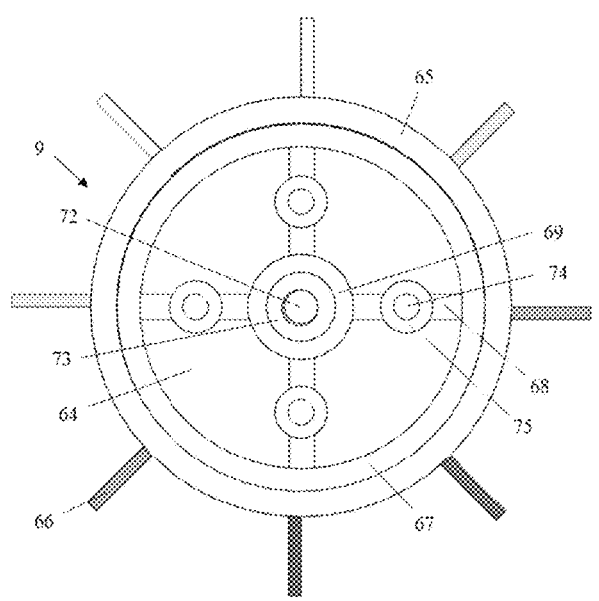
FIG. 16 is a Vortex Exhaust/Alternative Threaded Cone Alignment Base Overview, with a top view (FIG. 16a), and bottom view (FIG. 16b).
Figure 16B:
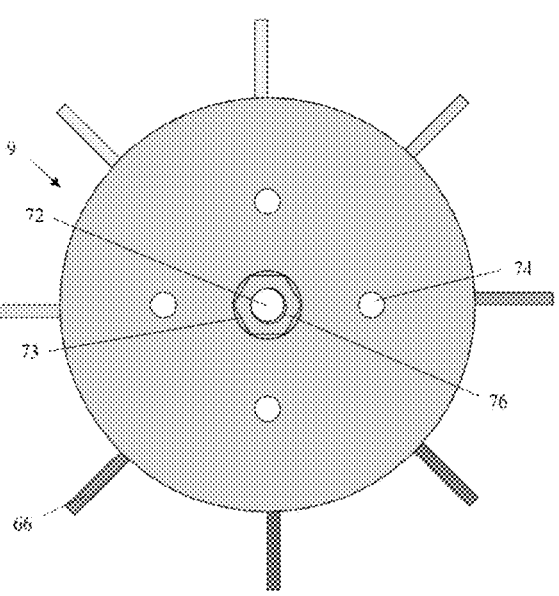

FIG. 16 is a Vortex Exhaust/Alternative Threaded Cone Alignment Base Overview, with a top view (FIG. 16*a*), and bottom view (FIG. 16*b*). The vortex exhaust/alternative cone alignment base 9 is utilized with the alternative threaded cone 8 illustrated in FIG. 13 and differs by the vortex exhaust/cone alignment base 9 illustrated in FIG. 14 in a few ways. First, instead of a smooth hollow central shaft 70, this base has a threaded central shaft 72, as seen on FIGS. 16*a* and 16*b*. Second, instead of the central reinforcement 69 being immediately around 70, there is a circular central shaft 73 that can rotate clockwise and counter-clockwise, as seen on FIGS. 16*a* and 16*b*. Third, the central reinforcement for the base 69 goes around 73 in this configuration, as seen on FIG. 16*a*. Fourth, there are axial alignment shafts 74 which extend through the radial reinforcements 68 and the base 64, as seen on FIGS. 16*a* and 16*b*. The front view of this configuration of 9 appears to be the same as FIG. 14*a*. The axial alignment extrusions 63 on the alternative threaded cone 8 extend through the axial alignment shafts 74 as the threaded extrusion 62 is threaded into 72. Together, the alignment extrusions 62 and shafts 74 align the cone 8 with the vortex chamber 7, as the cone position is raised and lowered by rotating 73 clockwise and counter-clockwise. Fifth, an axial alignment shaft reinforcement 75 is around each shaft 74 to reinforce the radial reinforcements 68, as seen on FIG. 16*a*. Finally, there is a motor attachment mount 76 on the bottom of 73, as seen on FIG. 16*b*. This is where an electrical motor 12 can be attached to rotate 73 to raise and lower the cone 8 via a control system 13 to automate the calibration process.

Figure 17A:
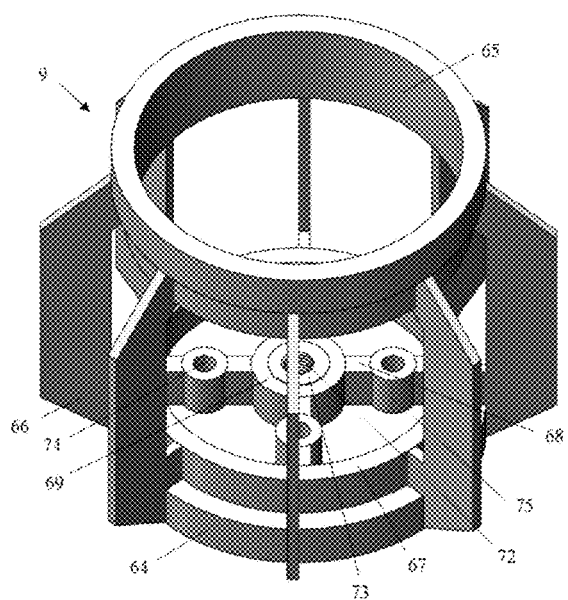
FIG. 17 is a Perspective View of the Vortex Exhaust/ Alternative Threaded Cone Alignment Base, with an upper-front perspective view (FIG. 17a) and a lower-front view perspective view (FIG. 17b).
Figure 17B:
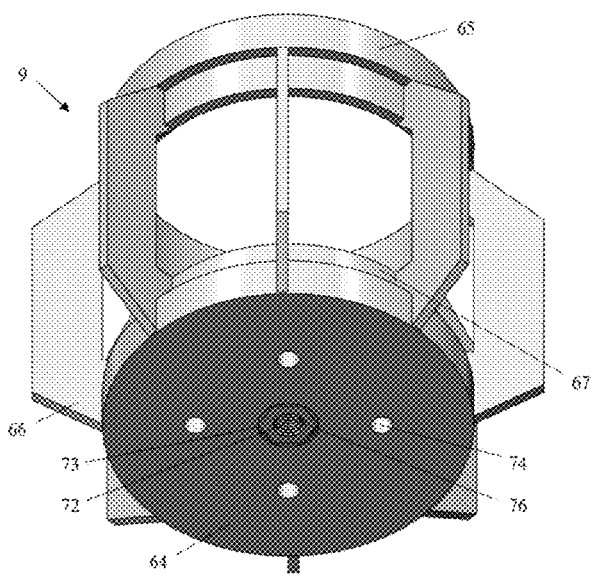

FIG. 17 is a Perspective View of the Vortex Exhaust/Alternative Threaded Cone Alignment Base, with an upper-front perspective view (FIG. 17*a*) and a lower-front view perspective view (FIG. 17*b*). All the reference numerals in FIG. 16 are visible in FIG. 17. On FIG. 17*a*, the axial alignment shaft reinforcement 75 can be seen having a similar height to the radial, circular, and central reinforcement structures 67, 68, and 69. The circular central shaft 73 can be seen extending from the center of 69 in FIG. 17*a* to the center of 64 on FIG. 17*b*, where the motor attachment mount 76 is located. The other functions of 64, 65, 66, 67, 68, and 69 identified on FIG. 15 above are applicable here. The vortex exhaust/alternative threaded cone alignment base 9 utilizes a threaded central shaft 72 that is held in axial alignment by 69 and 73, and reinforced by a plurality of 68, and held in alignment with the lower narrow vortex chamber 33, as seen on FIGS. 2 and 3, by 65 and a plurality of 66, while 72 is threaded onto 62 of cone 8, as seen on FIG. 13, holding 8 in axial alignment by a plurality of extrusions 63 which are inserted into 74, which are reinforced by 68 and 75, while 76 can be rotated clockwise and counter-clockwise manually or by an electric motor 12 to raise and lower the position of 8 inside 33, constitutes a means to position said cone 8 inside said lower narrow vortex chamber 33.

DRAWINGS—REFERENCE NUMERALS 1 helikon vortex
2 atmospheric gases
3 pressure sensor for atmospheric gases 4 CO$_2$ sensor for atmospheric gases
5 high-speed blower
6 airflow adapter
7 helikon vortex chamber
8 helikon vortex cone
9 helikon vortex exhaust/cone alignment base
10 dense molecular gas (vortex chamber exhaust)
11 low density molecular gas (vortex chamber product)
12 electrical motor
13 control system
14 relief control valve
15 relief valve gas output
16 relief valve output CO$_2$ sensor
17 vortex chamber control valve or controlled environment gaseous input control valve
18 vortex chamber control valve output
19 vortex chamber control valve output CO$_2$ sensor
20 controlled environment
21 pressure sensor for controlled environment
22 controlled environment gaseous output control valve
23 controlled environment exhaust
24 vortex output adapter
25 narrow vortex chamber cap/outlet
26 upper narrow vortex chamber
27 upper lateral vortex chamber adapter
28 blower input connector
29 radial to tangential airflow adapter
30 tangential airflow stabilizer
31 wide vortex chamber with tangential input
32 lower lateral vortex chamber adapter
33 lower narrow vortex chamber
34 interior cross-section area of tangential airflow stabilizer
35 excluded wedge from tangential airflow
36 reinforcement for the tangential airflow
37 wide vortex chamber cap/outlet
39 outer reinforcement for the tangential airflow
40 inner reinforcement for the tangential airflow
41 tangential airflow vent
42 narrow vortex chamber connector
43 wide vortex chamber connector
44 lateral adapter
45 interior of narrow vortex chamber connector
46 interior of wide vortex chamber connector
47 interior of lateral adapter
48 interior of narrow vortex chamber
49 exterior of narrow vortex chamber
50 narrow vortex chamber cap
51 interior of vortex output adapter
52 vortex chamber cap outlet
53 wide vortex chamber cap
54 effective surface of cone
55 base of cone
56 threaded core of cone
57 hollow interior of cone
58 reinforcement for threaded core of cone
59 inner radial reinforcement structure for cone
60 outer radial reinforcement structure for cone
61 circular reinforcement for cone
62 threaded extrusion
63 axial alignment extrusion
64 bottom of base
65 connector to vortex chamber
66 vent fin
67 circular reinforcement for base
68 radial reinforcement for base
69 central reinforcement for base
70 hollow central shaft
71 base hex nut intrusion
72 threaded central shaft
73 circular central shaft
74 axial alignment shaft
75 axial alignment shaft reinforcement
76 motor attachment mount Operation The operation for growing agricultural products with reduced $^{14}C$ content requires a controlled environment 20 with filtered atmospheric gases 2 from which CO$_2$ with $^{14}C$ has been removed.

1. A filtration system comprising a blower 5 and a helikon vortex 1 constitutes a means to remove CO$_2$ with $^{14}C$ from atmospheric gases 2; blower 5 output velocity of 322 km per hour or greater is required for effective filtration with helicon vortex 1;

2. Control valves 17, 22 are required to control the flow of gases entering and exiting the controlled environment 20;

3. When the CO$_2$ sensor 19 inside the controlled environment 20 detects a CO$_2$ abundance lower than a predetermined amount, the said filtration system is turned on by the control system 13 and the relief control valve 14 is opened;

4. The CO$_2$ sensor 16 at the relief output is monitored and compared to the CO$_2$ sensor 4 for atmospheric gases 2 outside the controlled environment to ensure said filtration system removal of CO$_2$ with $^{14}C$ from atmospheric gases 2 is effective by detecting a predetermined delta which can be determined by said filtration system efficiency;

5. Once effective filtration is verified, the control system 13 closes the relief control valve 14 and opens control valves 17, 22 which are connected to the controlled environment 20;

6. When the CO$_2$ sensor 19 inside the controlled environment 20 detects a CO$_2$ abundance above a predetermined amount, the said filtration system is turn off and the control valves 17, 22 are closed by the control system 13;

7. When the controlled environment input control valve 17 is open, the output control valve 22 is only opened by the control system 13 when the air pressure inside the controlled environment 20 as measured by the air pressure sensor 21 exceeds the atmospheric gas air pressure outside of the controlled environment by a predetermined amount as measured by air pressure sensor 3;

8. Operation of said filtration system is initially required for a duration sufficient to replace the entire volume of air inside the controlled environment 20. Thereafter, continuous, periodic, or intermittent operation as determined by CO$_2$ sensor 19, as detailed above, may be used to determine periods of operation for the filtration system to maintain sufficient CO$_2$ levels inside the controlled environment 20;

9. The control system 13 can either be programmed or configured to operate 5, 14, 17, and 22 utilizing electronic controls or switches with digital or analog signals, constituting a means to operate the blower and control valves. Similarly, 13 can either be programmed or configured to monitor digital or analog signals from 3, 4, 16, 19, and 21, constituting a means to monitor the sensors.

10. Helikon vortex 1 above may comprise either a bilateral compression helikon vortex or a unilateral compression helikon vortex as detailed below; effective filtration has been demonstrated with centrifugal acceleration exceeding 16,000 g, a maximum narrow vortex chamber radius of 5.08 cm, and a maximum height of 1.94 m.

11. Bilateral compression helikon vortex (FIG. 2) consists of an airflow adapter 6 (consisting of blower input connector 28, radial to tangential airflow adapter 29, tangential airflow stabilizer 30, and exclusion wedge 35), vortex chamber 7 (consisting of a wide vortex chamber 31, upper narrow vortex chamber 26, lower narrow vortex chamber 33, upper lateral adapter 27, and lower lateral adapter 32), cone 8, exhaust/cone alignment base 9, vortex output adapter 24, and narrow vortex chamber cap/outlet 25;

12. Unilateral compression helikon vortex (FIG. 3) consists of an airflow adapter 6 (consisting of blower input connector 28, radial to tangential airflow adapter 29, tangential airflow stabilizer 30, and exclusion wedge 35), vortex chamber 7 (consisting of a wide vortex chamber 31, lower narrow vortex chamber 33, and lower lateral adapter 32), cone 8, exhaust/cone alignment base 9, vortex output adapter 24, and wide vortex chamber cap/outlet 37;

13. During operation, the atmospheric gases 2 are accelerated by blower 5 and enter the airflow adapter 6 were they are stabilized and shaped prior to tangential injection into the wide vortex chamber 31; Centrifugal acceleration occurs while the atmospheric gases are separated by molecular density in vortex chamber 7; after separation, the high-density gases exit 7 between 33 and 8, while low-density gases exit 7 through 24;

14. Calibration of the helikon vortex is essential prior to operation and this is accomplished by adjusting the position of the cone 8 inside the narrow vortex chamber 33 to ensure effective separation of $CO_2$ with $^{14}C$. For manual calibration, the vortex exhaust/cone alignment base 9 utilizes a hex bolt held stationary in axial alignment by 69, 70, and 71 (FIG. 15), while cone 8 can be rotated clockwise and counter-clockwise to raise and lower the position of 8 inside 33. Alternatively, the calibration process can be automated with an electric motor 12. The vortex exhaust/alternative threaded cone alignment base 9 utilizes a threaded central shaft 72 that is held in axial alignment by 69 and 73 (FIG. 16), holding 8 in axial alignment by a plurality of extrusions 63 (FIG. 13) which are inserted into 74, while 76 can be rotated clockwise and counter-clockwise by an electric motor 12 to raise and lower the position of 8 inside 33.

REFERENCES CITED
U.S. PATENT DOCUMENTS

| | | | |
|---|---|---|---|
| 3,004,158 | October 1961 | Steimel, K. | |
| 3,421,334 | January 1969 | McKinney, et al. | 62-28 |
| 3,594,573 | July 1971 | Gerber, H. | |
| 3,925,036 | December 1975 | Shacter, J. | 55/158 |
| 3,939,354 | February 1976 | Janes, G. S. | 250/484 |
| 3,942,975 | March 1976 | Drummond, et al. | 75/10 R |
| 4,070,171 | January 1978 | Wikdahl | 55/419 |
| 4,311,674 | January 1982 | Janner, et al. | 204/157.22 |
| 4,584,073 | April 1986 | Laboda, et al. | 204/157.2 |
| 4,638,674 | October 1983 | Redmann | 73/863.12 |
| 4,816,209 | July 1986 | Schweiger | 376/309 |
| 7,332,715 B2 | February 2008 | Russ, et al. | 250/288 |
| 8,460,434 | June 2013 | Turner, et al. | 95/117 |
| 9,579,666 B2 | February 2017 | Mangadoddy, et al. | B04C 5/04 |

Other Publications

Feiverson, H. A., Glaser, A., Mian, Z., & Von Hippel, F. N., Unmaking the Bomb: A Fissile Material Approach to Nuclear Disarmament and Nonproliferation, The MIT Press, Cambridge, Mass., London, England (2014).

Genome Reference Consortium (GRC) Human Genome Assembly build 38 (GRCh38), 24 December 2013.

Lander, E. S. et al., Initial sequencing and analysis of the human genome, Nature 409, 860-921 (2001).

Moore, J. D. L., South Africa and Nuclear Proliferation, Palgrave Macmillan, New York, N.Y. (1987).

Patrick, A. D., & Patrick, B. E., Carbon 14 decay as a source of somatic point mutations in genes correlated with cancer diagnoses, Stable Isotope Foundation, Grants Pass, Oreg., USA (2017).

Purdom, C. E., Biological hazards of carbon-14, New Sci. 298, 255-257 (1962).

Sassi, M., et. al., Carbon-14 decay as a source of non-canonical bases in DNA, Biochimica et Biophysica Acta 1840 526-534 (2014).

Sender, R., Fuchs, S., & Milo, R., Revised estimates for the number of human and bacteria cells in the body, PLoS Biol 14 (8): e1002533 (2016).

I claim:

1. A method of removing carbon-dioxide with carbon-14 from atmospheric gases comprising:
   a. providing a mixture of atmospheric gases with a measurable abundance of carbon dioxide and a measurable abundance of carbon dioxide with carbon-14;
   b. accelerating said atmospheric gases to a predetermined velocity via a blower;
   c. performing centrifugal separation of said atmospheric gases via a wide vortex chamber;
   d. performing additional centrifugal separation of said atmospheric gases via an upper narrow vortex chamber;
   e. performing further centrifugal separation of said atmospheric gases via a lower narrow vortex chamber;
   f. connecting said wide vortex chamber and said upper narrow vortex chamber via an upper lateral adapter;
   g. connecting said wide vortex chamber and said lower narrow vortex chamber via a lower lateral adapter;
   h. connecting said blower and said wide vortex chamber via an airflow adapter, the airflow adapter comprising a blower input connector, a tangential airflow adapter, and a tangential airflow stabilizer, wherein the tangential airflow stabilizer further comprises inner reinforcements evenly spaced vertically and centered around the blower input connector, and wherein the interior cross-section of the airflow stream of the tangential airflow stabilizer is tapered or shaped at the top and bottom of the interior cross-section, excluding two wedge-shaped cross-sections from the tangential airflow;
   i. shaping airflow of said atmospheric gases during centrifugal separation inside said lower narrow vortex chamber via a cone having a tip and a foundation, the foundation has axial alignment extrusions aligned with the central axis of the cone;
   j. connecting a base having a top and bottom to said cone, the bottom of the base being perpendicular to the central axis of the lower narrow vortex chamber, the base has vertical vent fins symmetrically distributed around its central axis, connecting from the bottom of the base to the lower narrow vortex chamber, and the cone foundation has a diameter less than the diameter of the base to allow the cone foundation to be subsumed by the base, the bottom of the base has structural reinforcement to hold the cone foundation in alignment with the central axis of the lower narrow vortex chamber, the structural reinforcements including a central reinforcement, circular reinforcements, and symmetrically distributed radial reinforcements; and
   k. connecting a vent to said upper narrow vortex chamber to allow output of low-density gases from said atmospheric gases after centrifugal separation.

2. The method of claim 1, further comprising adjusting the position of the cone while remaining in alignment with the lower narrow vortex chamber.

3. A method of removing carbon-dioxide with carbon-14 from atmospheric gases comprising:
   a. providing a mixture of atmospheric gases with a measurable abundance of carbon dioxide and a measurable abundance of carbon dioxide with carbon-14;
   b. accelerating said atmospheric gases to a predetermined velocity via a blower;
   c. performing centrifugal separation of said atmospheric gases via a wide vortex chamber;
   d. performing additional centrifugal separation of said atmospheric gases via a lower narrow vortex chamber;
   e. connecting said wide vortex chamber and said lower narrow vortex chamber via a lateral adapter;
   f. connecting said blower said wide vortex chamber via an airflow adapter, the airflow adapter comprising a blower input connector, a radial to tangential airflow adapter, and a tangential airflow stabilizer, wherein the tangential airflow stabilizer further comprises inner reinforcements evenly spaced vertically and centered around the blower input connector, and wherein the interior cross-section of the airflow stream of the tangential airflow stabilizer is tapered or shaped at bottom of the interior cross-section, excluding a wedge-shaped cross-section from the tangential airflow;
   g. shaping airflow of said atmospheric gases during centrifugal separation inside said lower narrow vortex chamber via a cone of having a tip and a foundation, the foundation has axial alignment extrusions aligned with the central axis of the cone;
   h. connecting a base having a top and bottom to said cone, the bottom of the base being perpendicular to the central axis of the lower narrow vortex chamber, the base has vertical vent fins symmetrically distributed around its central axis, connecting from the bottom of the base to the lower narrow vortex chamber, and the cone foundation has a diameter less than the diameter of the base to allow the cone foundation to be subsumed by the base, the bottom of the base has structural reinforcements to hold the cone foundation in alignment with the central axis of the lower narrow vortex chamber, the structural reinforcements including a central reinforcement, circular reinforcements, and symmetrically distributed radial reinforcements; and
   i. connecting a vent to said wide vortex chamber to allow output of low-density gases from said atmospheric gases after centrifugal separation.

4. The method of claim 3, further comprising changing the radial airflow at the blower input connector to a vertical stream at the tangential airflow stabilizer via the radial to tangential airflow adapter.

5. The method of claim 3, further comprising adjusting the position of the cone while remaining in alignment with the lower narrow vortex chamber.

* * * * *